(12) United States Patent
Ikriannikov

(10) Patent No.: US 9,281,739 B2
(45) Date of Patent: Mar. 8, 2016

(54) BRIDGE MAGNETIC DEVICES AND ASSOCIATED SYSTEMS AND METHODS

(75) Inventor: Alexandr Ikriannikov, Castro Valley, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 545 days.

(21) Appl. No.: 13/598,281

(22) Filed: Aug. 29, 2012

(65) Prior Publication Data

US 2014/0062446 A1 Mar. 6, 2014

(51) Int. Cl.
| | |
|---|---|
| H01F 27/29 | (2006.01) |
| H01F 5/00 | (2006.01) |
| H01F 27/28 | (2006.01) |
| H02M 1/14 | (2006.01) |
| H01F 17/00 | (2006.01) |
| H02M 3/158 | (2006.01) |

(52) U.S. Cl.
CPC ............ H02M 1/14 (2013.01); H01F 17/0033 (2013.01); H01F 2017/0046 (2013.01); H02M 3/1584 (2013.01)

(58) Field of Classification Search
CPC .............. H01F 5/00; H01F 27/28; H01F 5/04
USPC .......................................... 336/200, 232, 192
See application file for complete search history.

(56) References Cited

U.S. PATENT DOCUMENTS

| | | | |
|---|---|---|---|
| 4,455,545 A | 6/1984 | Shelly | |
| 4,658,091 A | 4/1987 | McCarthy et al. | |
| 4,833,437 A * | 5/1989 | Williamson | ............... 336/192 |
| 5,023,578 A | 6/1991 | Kaneko et al. | |
| 5,161,098 A | 11/1992 | Balakrishnan | |
| 5,469,334 A | 11/1995 | Balakrishnan | |
| 5,565,837 A | 10/1996 | Godek et al. | |
| 5,568,111 A | 10/1996 | Metsler | |
| 5,574,420 A | 11/1996 | Roy et al. | |
| 5,631,822 A | 5/1997 | Silberkleit et al. | |
| 5,909,069 A | 6/1999 | Allen et al. | |

(Continued)

FOREIGN PATENT DOCUMENTS

| | | |
|---|---|---|
| EP | 1 632 964 | 3/2006 |
| JP | 2005 310865 | 4/2005 |

(Continued)

OTHER PUBLICATIONS

Dong et al., The Short Winding Path Coupled Inductor Voltage Regulators, Applied Power Electronics Conference and Exposition, pp. 1446-1452, Feb. 24-28, 2008.

(Continued)

*Primary Examiner* — Tsz Chan
(74) *Attorney, Agent, or Firm* — Lathrop & Gage LLP

(57) ABSTRACT

An electrical assembly includes a substrate, a bridge magnetic device disposed on an outer surface of the substrate, and at least one electrical component. The bridge magnetic device includes (1) a magnetic core disposed over and offset from a first portion of the outer surface of the substrate, (2) N windings wound around at least a portion of the magnetic core and electrically coupled to conductors of the substrate, where N is an integer greater than zero, and (3) a ground return conductor disposed on an outer surface of the magnetic core facing the first portion of the outer surface of the substrate. The at least one electrical component is disposed on the first portion of the outer surface of the substrate.

41 Claims, 18 Drawing Sheets

(56) References Cited

U.S. PATENT DOCUMENTS

| | | | |
|---|---|---|---|
| 6,060,977 A | 5/2000 | Yamamoto et al. | |
| 6,198,375 B1 | 3/2001 | Shafer | |
| 6,259,345 B1 | 7/2001 | De Graaf et al. | |
| 6,342,778 B1 | 1/2002 | Catalano et al. | |
| 6,362,986 B1 | 3/2002 | Schultz et al. | |
| 6,420,953 B1 | 7/2002 | Dadafshar | |
| 6,765,468 B2 | 7/2004 | Chen et al. | |
| 7,199,695 B1 | 4/2007 | Zhou et al. | |
| 7,239,530 B1 | 7/2007 | Djekic et al. | |
| 7,259,648 B2 | 8/2007 | Matsutani et al. | |
| 7,280,025 B2 | 10/2007 | Sano | |
| 7,292,128 B2 | 11/2007 | Hanley | |
| 7,317,305 B1 | 1/2008 | Stratakos et al. | |
| 7,352,269 B2 | 4/2008 | Li et al. | |
| 7,425,883 B2 | 9/2008 | Matsutani et al. | |
| 7,498,920 B2 | 3/2009 | Sullivan et al. | |
| 7,525,406 B1 | 4/2009 | Cheng | |
| 7,567,163 B2 | 7/2009 | Dadafshar et al. | |
| 7,649,434 B2 | 1/2010 | Xu et al. | |
| 7,994,888 B2 | 8/2011 | Ikriannikov | |
| 8,040,212 B2 | 10/2011 | Ikriannikov | |
| 8,299,882 B2 | 10/2012 | Ikriannikov | |
| 8,638,187 B2 | 1/2014 | Ikriannikov | |
| 8,674,798 B2 | 3/2014 | Ikriannikov | |
| 2002/0067234 A1 | 6/2002 | Kung | |
| 2006/0158297 A1* | 7/2006 | Sutardja | 336/174 |
| 2007/0102805 A1* | 5/2007 | Kim et al. | 257/698 |
| 2007/0175701 A1 | 8/2007 | Xu et al. | |
| 2007/0296533 A1 | 12/2007 | Springett | |
| 2008/0012674 A1 | 1/2008 | Sano et al. | |
| 2008/0136576 A1 | 6/2008 | Emmons et al. | |
| 2008/0150666 A1 | 6/2008 | Chandrasekaran et al. | |
| 2008/0205098 A1 | 8/2008 | Xu et al. | |
| 2008/0237790 A1 | 10/2008 | Yabuzaki et al. | |
| 2008/0303125 A1 | 12/2008 | Chen et al. | |
| 2008/0303624 A1 | 12/2008 | Yamada et al. | |
| 2008/0309442 A1 | 12/2008 | Hebert | |
| 2009/0059546 A1 | 3/2009 | Xing | |
| 2009/0175014 A1 | 7/2009 | Zeng et al. | |
| 2009/0179723 A1 | 7/2009 | Ikriannikov et al. | |
| 2009/0231081 A1 | 9/2009 | Ikriannikov et al. | |
| 2009/0237197 A1 | 9/2009 | Ikriannikov et al. | |
| 2010/0007457 A1 | 1/2010 | Yan et al. | |
| 2010/0013587 A1 | 1/2010 | Yan et al. | |
| 2010/0271161 A1 | 10/2010 | Yan et al. | |
| 2010/0328010 A1 | 12/2010 | Noma et al. | |
| 2011/0018668 A1* | 1/2011 | Imbimbo et al. | 336/136 |
| 2011/0018669 A1 | 1/2011 | Ikriannikov | |
| 2011/0032068 A1 | 2/2011 | Ikriannikov | |
| 2011/0035607 A1 | 2/2011 | Ikriannikov | |
| 2011/0043317 A1* | 2/2011 | Ikriannikov | 336/192 |
| 2011/0148559 A1* | 6/2011 | Ikriannikov | 336/192 |
| 2011/0148560 A1 | 6/2011 | Ikriannikov | |
| 2011/0169476 A1 | 7/2011 | Ikriannikov | |
| 2011/0279100 A1 | 11/2011 | Ikriannikov | |
| 2012/0056704 A1 | 3/2012 | Nagano et al. | |

FOREIGN PATENT DOCUMENTS

| | | |
|---|---|---|
| JP | 2005-183928 | 7/2005 |
| WO | WO 2006/026674 | 3/2006 |

OTHER PUBLICATIONS

Dong et al., Twisted Core Coupled Inductors for Microprocessor Voltage Regulators, Power Electronics Specialists Conference, pp. 2386-2392, Jun. 17-21, 2007.

* cited by examiner

BRIDGE MAGNETIC DEVICES AND ASSOCIATED SYSTEMS AND METHODS

BACKGROUND

Magnetic devices, such as inductors and transformers, are used in a wide variety of applications. One common application of magnetic devices is in switching power converters. For instance, inductors are frequently used to filter switching power converter waveforms, and transformers are often used to transform voltage levels and/or to provide electrical isolation in switching power converters.

FIG. 1 shows one application of an inductor in a switching power converter. Specifically, FIG. 1 shows an elevational view of a prior art electrical assembly 100 including a buck switching power converter 102 and a load 104 disposed on a substrate 106. FIG. 2 shows an electrical schematic of assembly 100. Switching power converter 102 includes input capacitors 108, a switching circuit 110, an inductor 112 including a winding 114 and a magnetic core 116, output capacitors 118, and a controller 120. The outline of winding 114 is shown by dashed lines in FIG. 1 where obscured by magnetic core 116. Input capacitors 108 and switching circuit 110 are electrically coupled across an input power source 122 (not shown in FIG. 1). A first end 124 of winding 114 is electrically coupled to switching circuit 110, and output capacitors 118 and load 104 are electrically coupled between second end 126 of winding 114 and a common node 128.

Controller 120 controls operation of switching circuit 110 such that the switching circuit repeatedly switches winding first end 124 between two different voltage levels, corresponding to a voltage on a positive power node 130 and a voltage on common node 128, to transfer power from input power source 122 to load 104. Input capacitors 108 supply the bulk of the high frequency components of converter input current 132. Thus, input capacitors 108 are located as close as possible to switching circuit 110 to minimize impedance between input capacitors 108 and switching circuit 110. Impedance in the connection between capacitors 108 and switching circuit 110 causes undesired parasitic ringing, which may result in excessive losses, electromagnetic compatibility issues, and/or converter control difficulties.

Output capacitors 118, on the other hand, filter output ripple current resulting from switching inductor 112 between voltage levels. Additionally, output capacitors 118 supply the high frequency components of converter output current 134 to load 104. Such role of capacitors 118 is particularly critical in applications with large changes in output current 134 magnitude and/or in applications where load 104 has stringent voltage regulation requirements, such as in applications where load 104 includes an information technology device processor. Thus, output capacitors 118 should be located close to both winding second end 126 and load 104, to minimize parasitic ringing and to maximize effectiveness of capacitors 118. Minimizing separation distance between winding second end 126, output capacitors 118, and load 104 promotes low parasitic impedance in conductors electrically coupling these components, since parasitic impedance is typically proportional to conductor length. Low parasitic impedance, in turn, promotes low conduction loss and also promotes transient performance by minimizing conductor voltage drop during transient load steps. Accordingly, output capacitors 118 are located between inductor 112 and load 104, so that the capacitors are close to both devices.

SUMMARY

In an embodiment, an electrical assembly includes a substrate, a bridge magnetic device disposed on an outer surface of the substrate, and at least one electrical component. The bridge magnetic device includes (1) a magnetic core disposed over and offset from a first portion of the outer surface of the substrate, (2) N windings wound around at least a portion of the magnetic core and electrically coupled to conductors of the substrate, where N is an integer greater than zero, and (3) a ground return conductor disposed on an outer surface of the magnetic core facing the first portion of the outer surface of the substrate. The at least one electrical component is disposed on the first portion of the outer surface of the substrate.

In an embodiment, an electrical assembly includes a substrate, at least one electrical component disposed on the substrate, and a bridge magnetic device disposed on the substrate. The bridge magnetic device includes a magnetic core and a ground return conductor arranged such that (1) the at least one electrical component is disposed between the substrate and the ground return conductor, and (2) the ground return conductor is disposed between the at least one electrical component and the magnetic core.

In an embodiment, an electrical assembly includes a substrate and a bridge inductor disposed on an outer surface of the substrate. The bridge inductor includes (1) a magnetic core offset from and disposed over a first portion of the outer surface of the substrate, and (2) a winding wound around at least a portion of the magnetic core. The winding has opposing first and second ends electrically coupled to conductors of the substrate. The electrical assembly further includes a switching circuit, a plurality of capacitors, and a load. The switching circuit is operable to repeatedly switch the first end of the winding between at least two different voltage levels. The plurality of capacitors is disposed on the first portion of the outer surface of the substrate, and the plurality of capacitors is electrically coupled to the second end of the winding. The load is disposed on the substrate proximate to the second end of the winding, and the load is electrically coupled to the second end of the winding. The bridge inductor, the switching circuit, and the plurality of capacitors collectively form at least part of a switching power converter operable to at least partially power the load.

In an embodiment, an electrical assembly includes a substrate, a bridge magnetic device disposed on an outer surface of the substrate, and at least one electrical component. The bridge magnetic device includes (1) a magnetic core disposed over a first portion of the outer surface of the substrate, and (2) N windings wound around at least a portion of the magnetic core. N is an integer greater than zero. The N windings form one or more flexible stand-offs offsetting the magnetic core from the first portion of the outer surface of the substrate, and the one or more flexible stand-offs allow the magnetic core to move with respect to the substrate. The at least one electrical component is disposed over the first portion of the outer surface of the substrate.

DETAILED DESCRIPTION OF THE EMBODIMENTS

It has been discovered that bridge magnetic devices, such as bridge inductors or bridge transformers, can be used to promote small size, high efficiency, and/or high performance in an electrical assembly.

Figure 3:
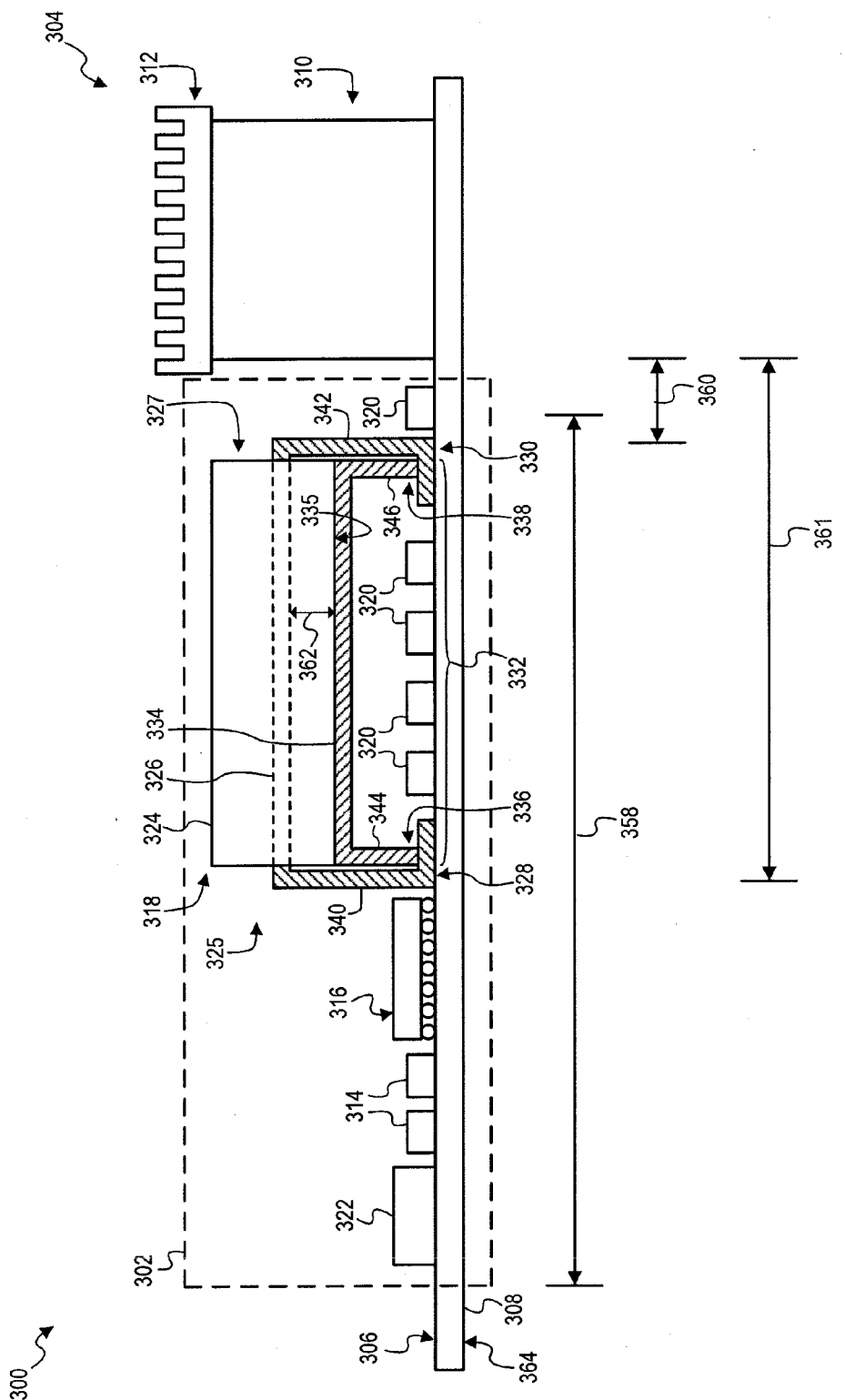
FIG. 3 shows an elevational view of an electrical assembly including a buck switching power converter and a load disposed on a substrate, according to an embodiment.
Figure 4:
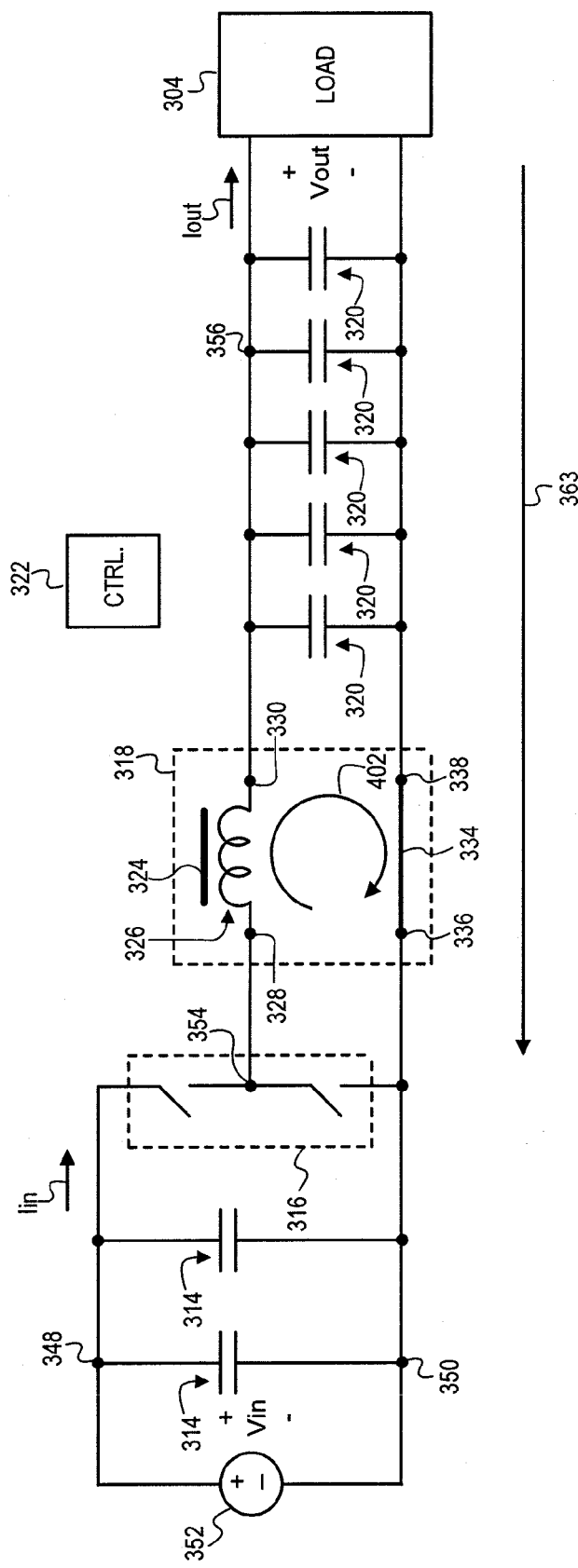
FIG. 4 is an electrical schematic of the assembly of FIG. 3.

For example, FIG. 3 shows an elevational view of an electrical assembly 300 including a buck switching power converter 302 and a load 304 disposed on an outer surface 306 of a substrate 308. Substrate 308 is, for example, a printed circuit board. In some embodiments, load 304 is a component of an information technology device, such as a computer or a telecommunication device. For example, in certain embodiments, load 304 includes a processor 310 with an optional heat sink 312 disposed thereon, as shown in FIG. 3. However, load 304 could take other forms without departing from the scope hereof. FIG. 4 is an electrical schematic of assembly 300.

Switching power converter 302 includes input capacitors 314, a switching circuit 316, a bridge inductor 318, output capacitors 320, and a controller 322. In some embodiments, one or more of input and output capacitors 314, 320 are multi-layer ceramic capacitors. Bridge inductor 318 includes a magnetic core 324 having opposing sides 325, 327, and a staple-style winding 326 wound around at least a portion of core 324. The outline of winding 326 is shown by dashed lines where obscured by core 324 in FIG. 3. Opposing first and second ends 328, 330 of winding 326 terminate at core first and second sides 325, 327, respectively. Winding ends 328, 330 also form respective solder tabs electrically coupled, such as surface mount soldered, to conductors (not shown) on substrate 308. In certain alternate embodiments, however, winding ends 328, 330 are electrically coupled to substrate 308 conductors in other ways, such as via thru-hole or socket pins.

Magnetic core 324 is disposed over and offset from a first portion 332 of substrate outer surface 306. Bridge inductor 318 further includes a ground return conductor 334 disposed on an outer surface 335 of magnetic core 324 facing substrate outer surface first portion 332, where outer surface 335 connects first and second core sides 325, 327. In some embodiments, ground return conductor 334 extends from core first side 325 to core second side 327 on outer surface 335, as shown. As discussed below, opposing ends 336, 338 of ground return conductor 334 form solder tabs (not shown) electrically coupled to conductors on substrate 308, such that ground return conductor 334 is adapted to provide a path for current flowing from load 304 to switching circuit 316. For example, in some embodiments, the ground return conductor solder tabs are surface mount soldered to conductors on substrate 308. In certain alternate embodiments, however, ground return conductor ends 336, 338 are electrically coupled to substrate 308 conductors in other ways, such as via thru-hole or socket pins. Portions 340, 342 of winding 326 serve as standoffs adapted to offset magnetic core 324 from outer surface portion 332. Additionally, portions 344, 346 of ground return conductor 334 also serve as standoffs adapted to offset core 324 from outer surface first portion 332.

Some of output capacitors 320 are disposed on substrate outer surface first portion 332. Thus, certain of output capacitors 320 are disposed between substrate 308 and ground return conductor 334, and ground return conductor 334 is disposed between capacitors 320 and magnetic core 324. Accordingly, bridge inductor 318 "bridges" some of output capacitors 320. For example, in a certain embodiment, bridge inductor 318 is adapted such that magnetic core 324 is offset by about 1.5 millimeters from substrate outer surface portion 332, to allow bridging of capacitors 320 in embodiments where capacitors 320 are ceramic capacitors having a 1.2 millimeter height.

Input capacitors 314 and switching circuit 316 are electrically coupled across input and common power nodes 348, 350. Input and common power nodes 348, 350 are, in turn, electrically coupled to an input power source 352 (not shown in FIG. 3), such as another power converter, a photovoltaic device, and/or a battery. Winding first end 328 is electrically coupled to switching circuit 316 at switching node 354, and winding second end 330 is electrically coupled to an output power node 356. Output capacitors 320 and load 304 are electrically coupled between output power node 356 and common power node 350. Ground return conductor 334 forms part of common power node 350, as shown in FIG. 4.

Controller 322 causes switching circuit 316 to repeatedly switch winding first end 328 between at least two different voltage levels, corresponding to voltage levels of input and common power nodes 348, 350, to transfer power from input power source 352 to load 304. In certain embodiments, controller 322 is operable to regulate one or more operating characteristics of assembly 300, such as input voltage Vin magnitude, input current Iin magnitude, input power magnitude, output voltage Vout magnitude, output current Io magnitude, and/or output power magnitude. Controller 322 is typically adapted to cause switching circuit 316 to switch at a frequency of 20 kilohertz or greater to promote low ripple current magnitude, fast converter transient response, and/or operation outside of a frequency range perceivable by humans.

Figure 1:
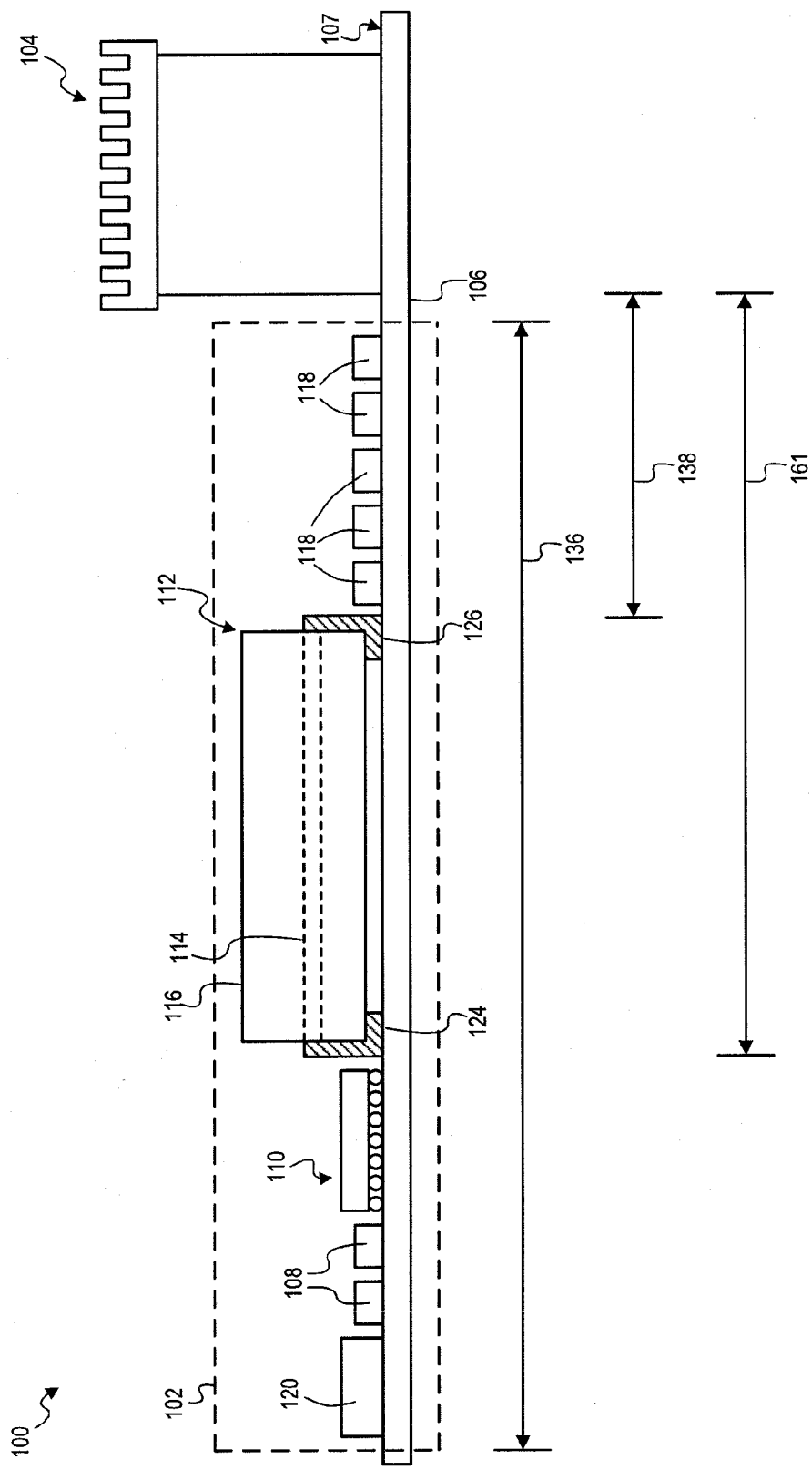
FIG. 1 shows an elevational view of a prior art electrical assembly including a buck switching power converter and a load disposed on a substrate.

Use of bridge inductor 318 in place of a conventional inductor, such as inductor 112 of FIG. 1, helps assembly 300 potentially achieve one or more advantages over conventional electrical assemblies, such as assembly 100 of FIG. 1. For example, use of bridge inductor 318 allows electrical components to be placed under the inductor's core 324, thereby helping reduce the amount of surface area occupied by converter 302. As can be observed from FIGS. 1 and 3, width 358 of converter 302 of FIG. 3 is significantly smaller than width 136 of converter 102 of FIG. 1, even though both converters have the same number of components.

As another example, use of bridge inductor 318 helps protect components under the inductor from mechanical damage. Bridge inductor 318 is typically larger and more mechanically robust than components located under its core. Accordingly, placement of bridge inductor 318 over components may insulate the components from mechanical stress that might otherwise damage the components and/or component connections.

Applicant has also discovered a synergistic arrangement of components in assembly 300 which helps minimize substrate conductor losses while promoting high performance. In particular, Applicant has discovered that disposing output capacitors 320 under bridge inductor 318, and disposing load 304 at core second side 327 proximate to winding second end 330, as shown in FIG. 3, promotes both high performance and low losses. In this component arrangement, capacitors 320 are close to both of winding second end 330 and load 304, thereby promoting low parasitic ringing and high capacitor effectiveness. Additionally, relatively few of output capacitors 320 are disposed between winding second end 330 and load 304. Thus, the FIG. 3 component arrangement allows use of short substrate conductors electrically coupling winding second end 330 to load 304, and coupling load 304 to switching circuit 316. For example, a substrate conductor electrically coupling load 304 to winding second end 330 potentially needs to span only a relatively small linear separation distance 360 between these two components. Additionally, a substrate conductor electrically coupling load 304 to switching circuit 316, to provide a path for return current (symbolically represented by arrow 363 in FIG. 4), need only span relatively small separation distance 361 between these components. A short substrate conductor, in turn, promotes low conductor impedance and associated conduction losses, since impedance is proportional to conductor length.

It should be appreciated that reducing substrate conductor length can significantly reduce conduction losses since substrate conductors are typically formed of thin metallic foil having a relatively large resistance. Applicant has conducted simulations showing that the component arrangement of FIG. 3 may improve efficiency from 2% to 4%, relative to an otherwise similar assembly where the load is significantly separated from the inductor.

Figure 2:
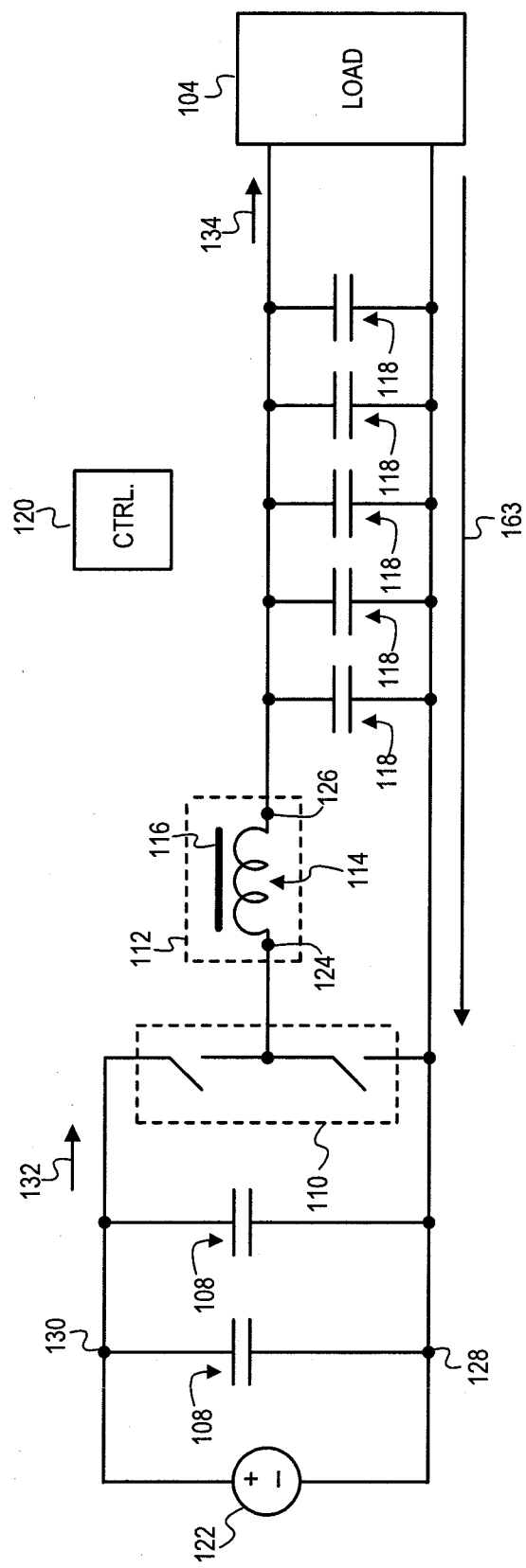
FIG. 2 is an electrical schematic of the assembly of FIG. 1.

In conventional assembly 100 of FIG. 1, in contrast, output capacitors 118 are necessarily disposed between inductor 112 and load 104, as discussed above, thereby separating load 104 from inductor 112. Therefore, a conductor electrically coupling winding second end 126 and load 104 in assembly 100 must span at least the relatively large separation distance 138 separating second winding end 126 and load 104. Additionally, a conductor electrically coupling load 104 to switching circuit 110, to provide a path for return current (symbolically represented by arrow 163 in FIG. 2), will need to span at least a relatively large separation distance 161 between these components. Accordingly, substrate 100 will typically experience significantly greater inductor-to-load and load-to-switching circuit conduction losses than assembly 300, assuming both assemblies have similar substrate conductor thicknesses and widths.

Figure 5:
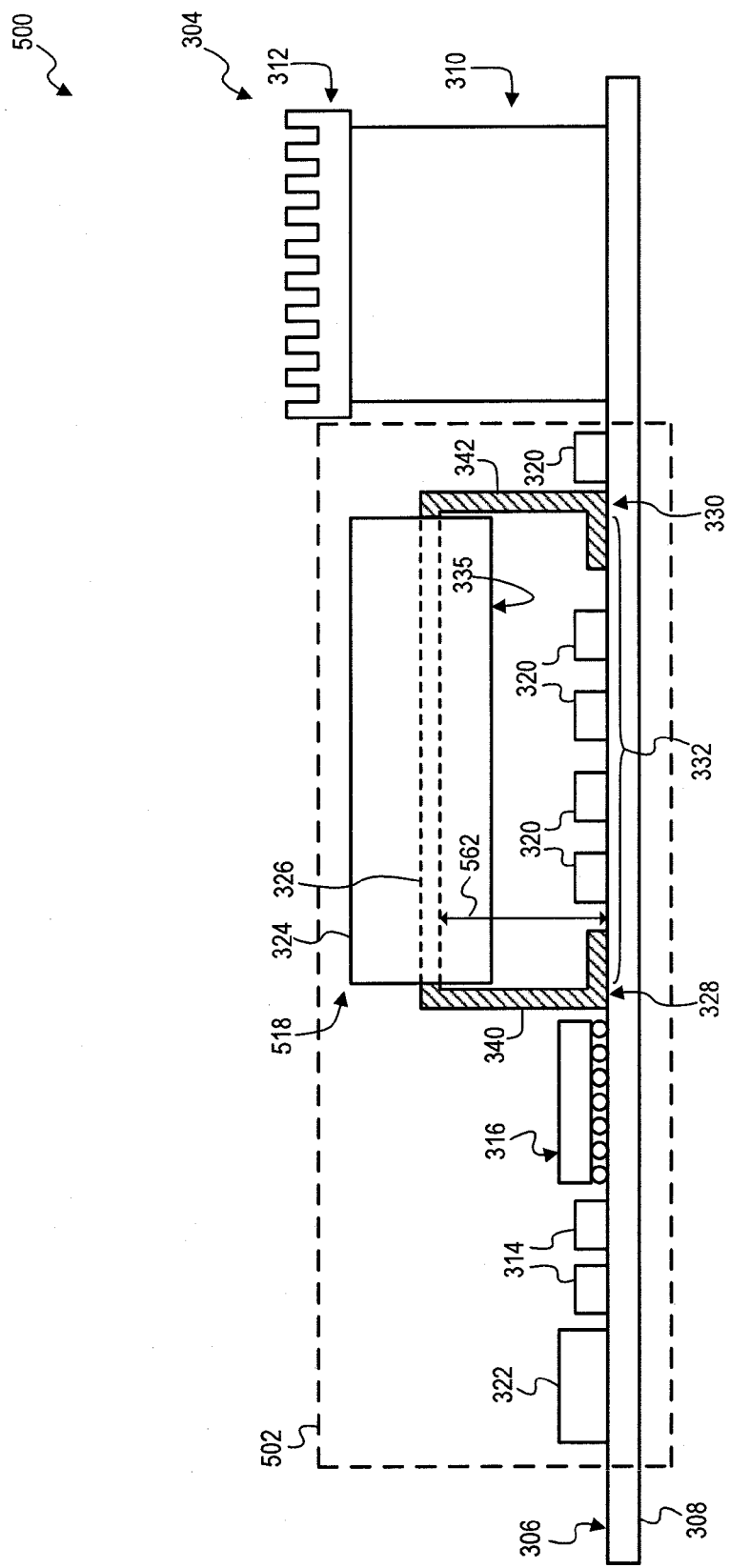
FIG. 5 shows an elevational view of another electrical assembly including a buck switching power converter and a load disposed on a substrate, according to an embodiment.
Figure 6:
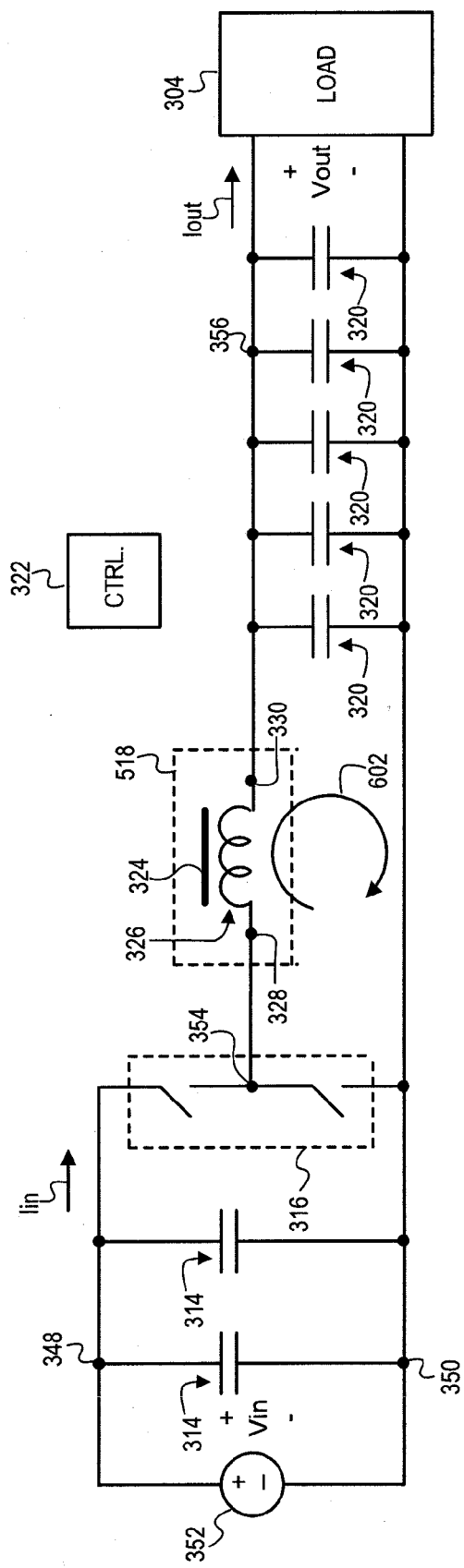
FIG. 6 is an electrical schematic of the assembly of FIG. 5.

Incorporation of ground return conductor 334 in bridge inductor 318 may also achieve significant advantages. To help appreciate some of these advantages, first consider a scenario without ground return conductor 334. FIG. 5 shows a side elevational view of an electrical assembly 500, which is similar to assembly 300 of FIG. 3, but includes a buck switching power converter 502 with bridge inductor 318 replaced by an alternate bridge inductor 518. In contrast to bridge inductor 318 of FIG. 3, bridge inductor 518 of FIG. 5 does not include a ground return conductor. FIG. 6 shows an electrical schematic of assembly 500.

Figure 7:
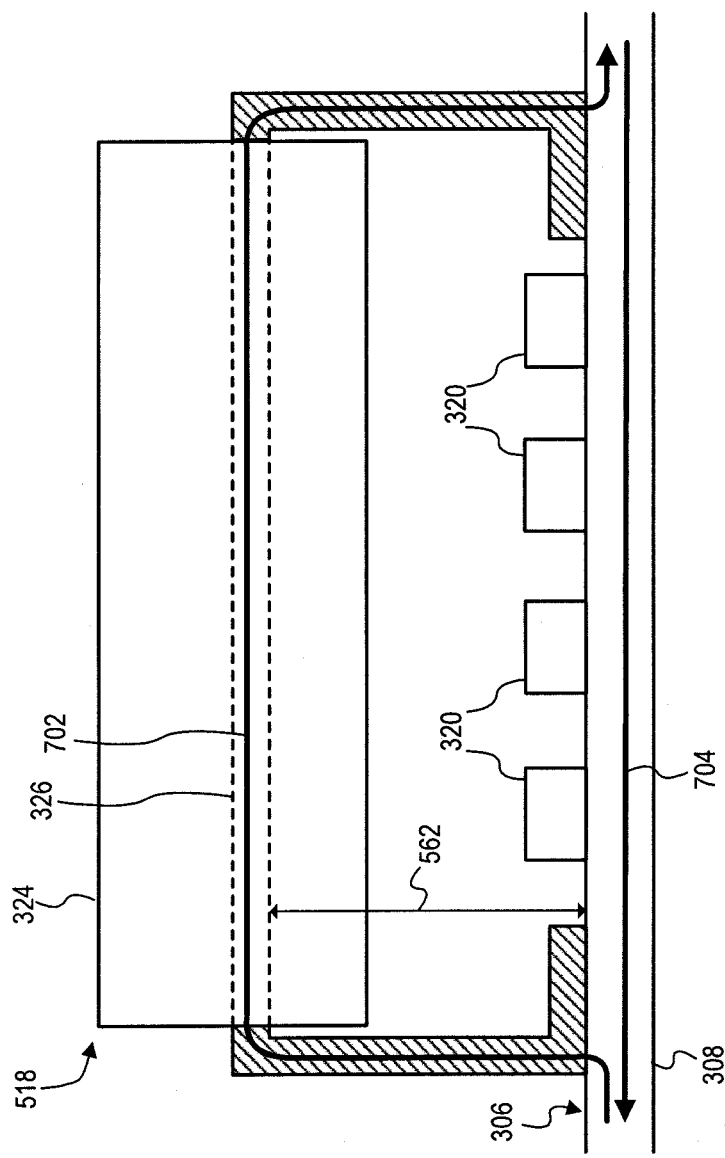
FIG. 7 illustrates the approximate flow of current through a portion of a current loop of the assembly of FIG. 5.

As shown in FIG. 6, bridge inductor 518 is part of a current loop 602. Current loop 602 includes input power source 352, switching circuit 316, inductor 518, load 304, and conductors in substrate 308 connecting these components. FIG. 7 illustrates the approximate flow of current through loop 602 in the vicinity of inductor 518. Arrow 702 represents current flowing through winding 326 from switching circuit 316 to load 304. Arrow 704 represents current flowing through conductors of substrate 308 from load 304 back to switching circuit 316. Loop 602 has a relatively large size in the vicinity of inductor 518 due to winding 326 being separated from substrate 308 by separation distance 562. Additionally, components bridged by inductor 518 are within or near loop 602, as illustrated in FIG. 7, since the components are between winding 326 and substrate conductors carrying current from load 304 to switching circuit 316. Such characteristics of assembly 500 may result in one or more disadvantages.

For example, the fact that components under inductor 518 are within or near current loop 602 typically results in the components being within the magnetic flux path of loop 602. Magnetic flux generated by current flowing through loop 602 may induce circulating currents in conductive portions of components within this magnetic flux path. For instance, magnetic flux generated by current flowing through loop 602 may induce circulating currents in the lead frames and connector pins of components disposed under inductor 518. These circulating currents are generally undesirable because they cause losses and associated component heating. Additionally, circulating currents may cause improper component operation, particularly if the components contain logic circuitry or switching device drivers. Thus, locating components under bridge inductor 518 may result in undesired losses, heating, and/or improper assembly operation.

As another example, the fact that loop 602 is defined by winding 326 and conductors in substrate 308 causes inductance associated with inductor 518 to be a function of substrate 308's configuration. For instance, inductance associated with inductor 518 may vary depending on the location and size of conductors in substrate 308, particularly in embodiments where inductance associated with inductor 518 is intended to be small. Such dependence on substrate 308 configuration may make it difficult to achieve a desired inductance value.

Additionally, the relatively large size of current loop 602 in the vicinity of inductor 518 creates a relatively large magnetic flux path, thereby potentially enabling the flux to magnetically couple to components or circuitry external to inductor 518. Such magnetic coupling may result in undesired losses, heating, and/or electromagnetic compatibility issues. For instance, stray magnetic flux from current loop 602 may cause electromagnetic interference with other circuitry on substrate 308 near converter 502. Additionally, the stray magnetic flux may extend beyond assembly 500, thereby potentially causing electromagnetic interference with external equipment and preventing compliance with electromagnetic compatibility regulations. Accordingly, electromagnetic filtering and/or shielding may be required to negate detrimental effects of stray magnetic flux in assembly 500. Such filtering and shielding typically increases assembly cost and/or size.

Figure 8:
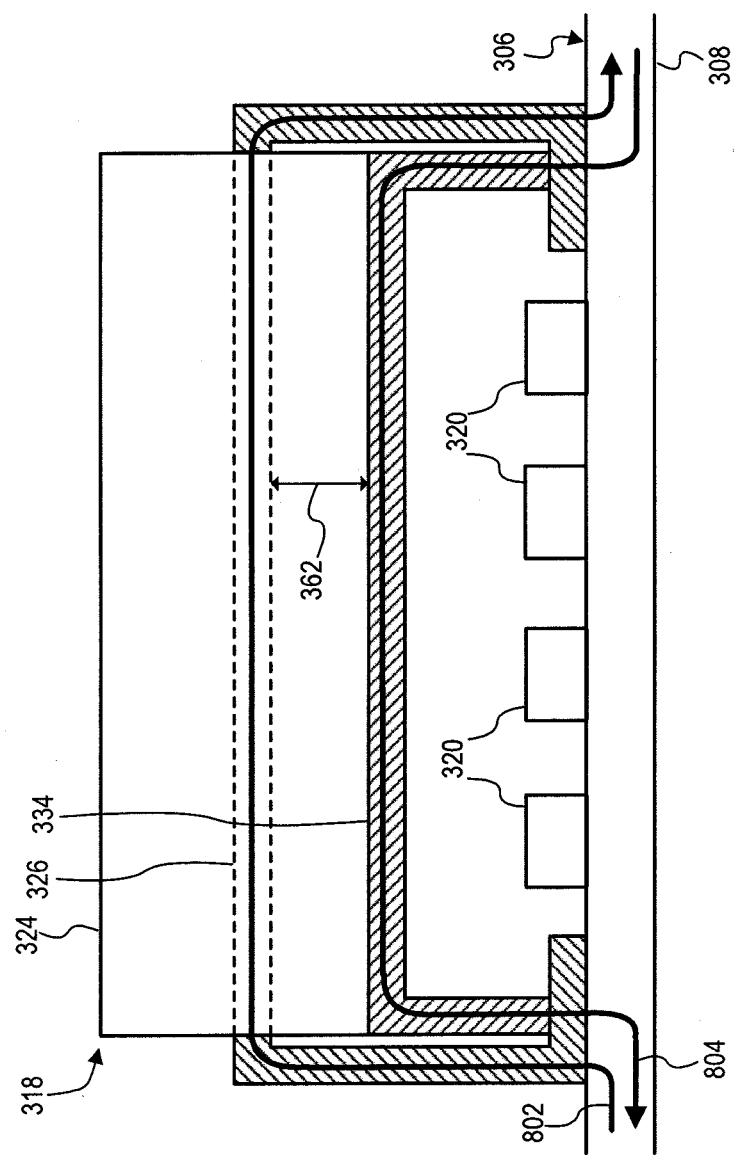
FIG. 8 illustrates the approximate flow of current through a portion of a current loop of the assembly of FIG. 3.

Applicant has discovered, however, that these disadvantages associated with use of a bridge inductor can potentially be reduced, or even essentially eliminated, by addition of a ground return conductor to the bridge inductor. Returning to FIGS. 3 and 4, inductor 318 is part of a current loop 402, as shown in FIG. 4. Current loop 402 includes input power source 352, switching circuit 316, inductor 318, load 304, and conductors in substrate 308 connecting these components. FIG. 8 illustrates the approximate flow of current through loop 402 in the vicinity of inductor 318. Arrow 802 represents current flowing through winding 326 from switching circuit 316 to load 304. Arrow 804 represents current flowing from load 304 back to switching circuit 316. In contrast to assembly 500 of FIG. 5, current loop size in the vicinity of the bridge inductor is relatively small and well defined. In particular, current flowing from load 304 to switching circuit 316 flows through ground return conductor 334 as a path of least DC and AC impedance, instead of through substrate conductors, in the vicinity of inductor 318. Thus, current loop 402 is defined by winding 326 and ground return conductor 334 is the vicinity of inductor 300. As discussed above, ground return conductor 334 is disposed on a core outer surface 335, such that linear separation distance 362 between winding 326 and ground return conductor 334 is relatively small. Accordingly, inductance associated with inductor 318 is typically not significantly dependent on substrate 308's configuration. Additionally, the relatively small size of current loop 402 near inductor 318 promotes containment of magnetic flux resulting from current flowing in loop 402, thereby reducing the likelihood of problematic coupling of the magnetic flux to external components and circuitry.

Furthermore, the fact that current loop 402 is defined by winding 326 and ground return conductor 334 means that components bridged by inductor 318, such as capacitors 320, are outside of current loop 402, as illustrated in FIG. 8. Such fact helps minimize coupling of magnetic flux generated by current flowing through loop 402 to components under inductor 318, thereby helping minimize associated losses, heating, and potential improper operation. Indeed, the inclusion of ground return conductor 334 may reduce magnetic flux levels under inductor 318 to the point where it is possible to locate components which are sensitive to magnetic flux, such as control logic or switching device drivers, under inductor 318.

It is anticipated that ground return conductor 334 will typically be formed of a material, such as copper, that has a high thermal, as well as electrical, conductivity. Accordingly, incorporation of ground return conductor 334 in bridge inductor 318 may help cool inductor 318 and components in its vicinity. In some alternate embodiments, a heat transfer device, such as a heat pipe, thermally couples one or more components disposed on substrate outer surface first portion 332 to ground return conductor 334, thereby helping cool the components.

In certain embodiments, stand-offs 340, 342, 344, 346 are flexible, such that they allow magnetic core 324 to move with respect to substrate 308. Such feature promotes assembly 300 reliability by allowing core 324 to move and thereby compensate for mechanical changes in substrate 308. For example, substrate 308 may expand or contract due to temperature change, and substrate 308 may flex due to mechanical force. Flexibility in stand-offs 340, 342, 344, 346 is achieved, for example, by forming winding 326 and ground return conductor 334 of flexible metallic foil that allows magnetic core 324 to move with respect to substrate 308. If stand-offs 340, 342, 344, 346 are not flexible, these mechanical changes to substrate 308 may cause one or more winding or ground return conductor ends to break or separate from substrate 308, thereby damaging assembly 300. Additionally, the fact that magnetic core 324 is offset from substrate 308 further promotes mechanically assembly flexibility by allowing room for substrate 308 to move with respect to magnetic core 324, thereby promoting assembly robustness.

In assembly 100 of FIG. 1, in contrast, magnetic core 116 is disposed essentially directly on substrate 106 outer surface 107. Thus, winding ends 124, 126 will have limited freedom to compensate for mechanical changes in assembly 100, such as thermal expansion and contraction of substrate 106. Furthermore, the fact that magnetic core 116 almost essentially touches substrate outer surface 107 allows little room for movement between the components. For example, if substrate 106 is flexed such that the substrate extends upward in the area of magnetic core 116 and downward at the substrate edges, such flexing will push the substrate into core 116, thereby creating significant mechanical stress of winding ends 124, 126 soldered to substrate 106 conductors. This stress may cause winding end solder joints to break. In assembly 300 of FIG. 3, on the other hand, space between substrate outer surface 306 and core 324 potentially allows for substrate 308 to flex towards core 324 without damaging the assembly.

The number and type of components of assembly 300 may be varied without departing from the scope hereof. For example, the number of input or output capacitors may be changed, or additional control circuit may be added. Furthermore, the placement of components in assembly 300 may be varied without departing from the scope hereof. For example, one or more components could optionally be disposed on substrate bottom outer surface 364, thereby potentially enabling converter width 358 to be reduced.

In some alternate embodiments, components in addition to output capacitors 320, and/or in place of output capacitors 320, are bridged by bridge inductor 318. For example, in certain alternate embodiments, switching circuit 316 and/or controller 322 are disposed on substrate outer surface 306 under core 324. As discussed above, inclusion of ground return conductor 334 in bridge inductor 318 may enable sensitive components, such as switching circuits and controllers, to be disposed under core 324.

Although ground return conductor 334 offers a number of potential advantages, as discussed above, in some alternate embodiments, ground return conductor 334 is omitted to reduce cost and/or complexity, such as shown in FIG. 5. Additionally, in certain alternate embodiments, one or more substrate conductors are electrically coupled in parallel with ground return conductor 334, such as to increase converter 302's capacity, with the potential tradeoff of a reduction in advantages realized by use of the ground return conductor. Furthermore, in some alternate embodiments, winding 326 and/or ground return conductor 334 are electrically coupled to substrate conductors by additional solder tabs. Winding and ground return conductor solder tabs are interleaved, for example, in some of these alternate embodiments to further reduce current loop 402 size in the vicinity of inductor 318.

Figure 9:
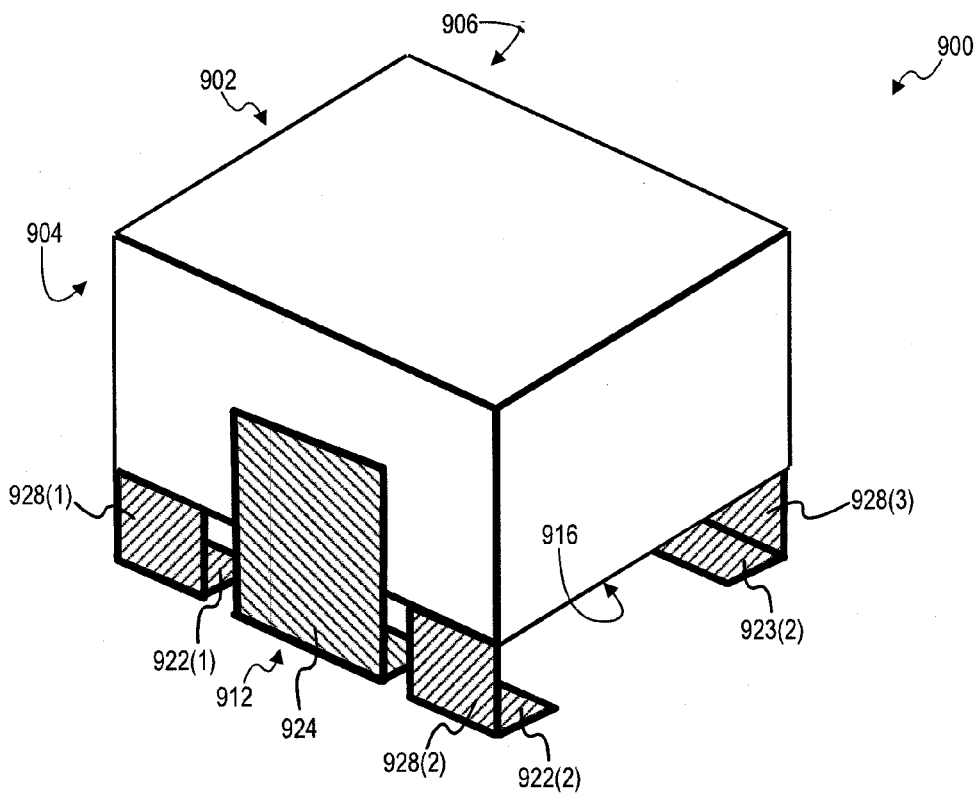
FIG. 9 shows a perspective view of a bridge inductor, according to an embodiment.
Figure 10:
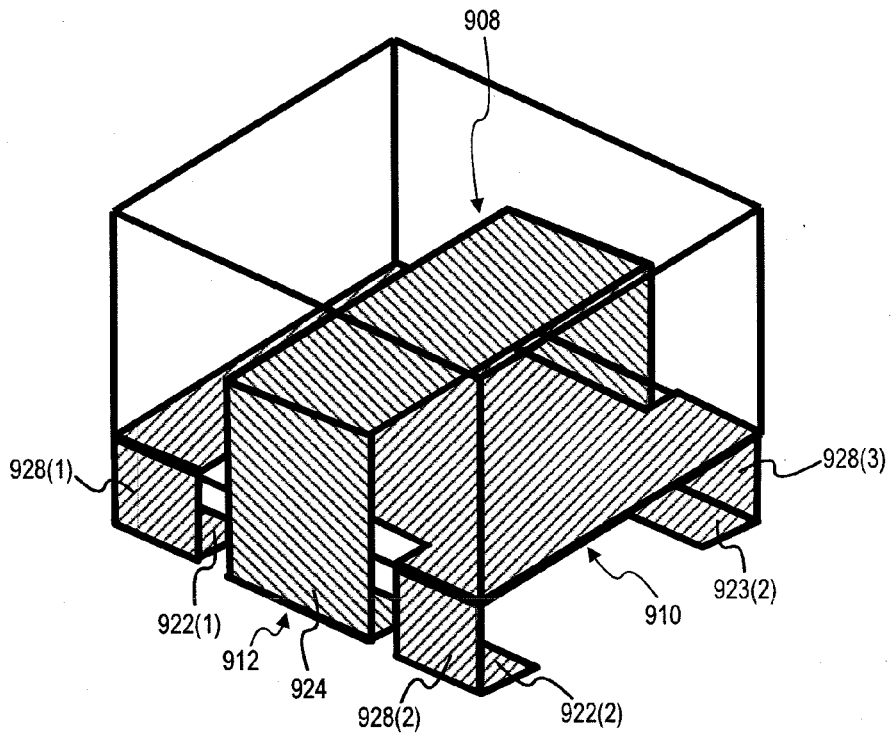
FIG. 10 shows a perspective view of the FIG. 9 bridge inductor with its magnetic core shown as transparent.
Figure 11:
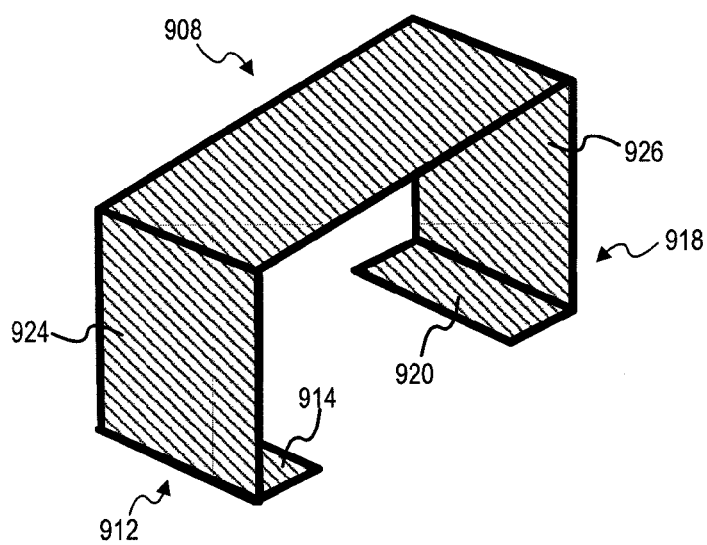
FIG. 11 shows a perspective view of the winding of the FIG. 9 bridge inductor.
Figure 12:
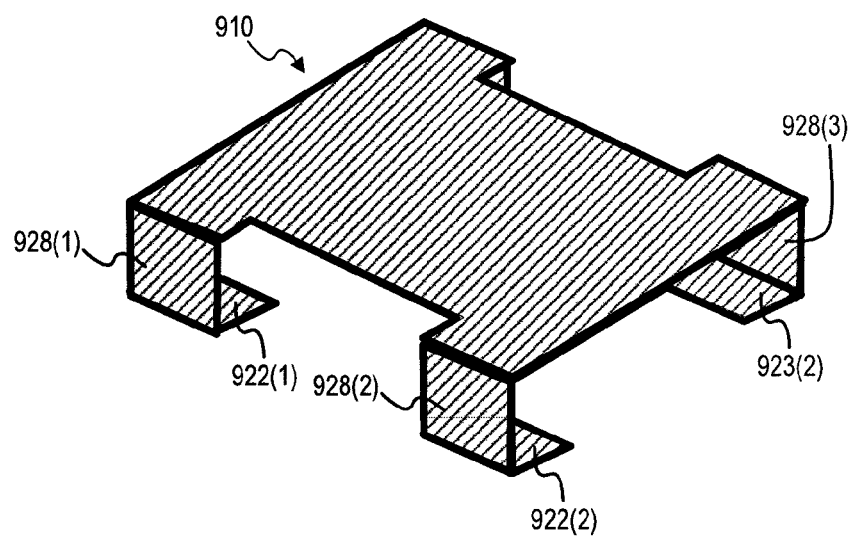
FIG. 12 shows a perspective view of the ground return conductor of the FIG. 9 bridge inductor.

Assembly 300 could be modified to use an alternative bridge inductor in place of bridge inductor 318. For example, FIG. 9 shows a perspective view of a bridge inductor 900, which is one possible alternative to bridge inductor 318. Bridge inductor 900 includes a magnetic core 902 having opposing first and second sides 904, 906, a staple-style winding 908, and a ground return conductor 910. FIG. 10 shows a perspective view of inductor 900 with magnetic core 902 shown as transparent, FIG. 11 shows a perspective view of winding 908, and FIG. 12 shows a perspective view of ground return conductor 910.

Winding 908 is wound through magnetic core 902 from first side 904 to second side 906. A first end 912 of winding 908 extends from core first side 904 and wraps under core 904 to form a first solder tab 914 facing, but offset from, a bottom outer surface 916 of the core. Similarly, a second end 918 of winding 908 extends from core second side 906 and wraps under core 902 to form a second solder tab 920 facing, but offset from, core bottom outer surface 916. Magnetic core 902 is formed, for example, of a ferrite material.

Ground return conductor 910 is disposed on core bottom outer surface 916, such that magnetic core 902 does not form a magnetic path loop around ground return conductor 910. Ground return conductor 910 extends from core first side 904 to core second side 906 on core bottom outer surface 916. Ground return conductor 910 forms two first solder tabs 922 at core first side 904, and two second solder tabs 923 at core second side 906. Solder tabs 922, 923 face, but are offset from, core bottom outer surface 916. In this document, specific instances of an item may be referred to by use of a numeral in parentheses (e.g., solder tab 922(1)) while numerals without parentheses refer to any such item (e.g., solder tabs 922). Only one of the two second solder tabs 923 are visible in the perspective views of FIGS. 9, 10, and 12; the other second solder tab is disposed opposite of solder tab 922(1) and mirrors solder tab 922(1). First solder tab 914 of winding 908 is interleaved with first solder tabs 922 of ground return conductor 910, and second solder tab 920 of winding 908 is interleaved with second solder tabs 923 of ground return conductor 910. Such interleaving promotes small size of a current loop including bridge inductor 900. Portions 924, 926 of winding 908 and portions 928 of ground return conductor 910 are adapted to serve as stand-offs offsetting magnetic core 902 from a surface, such as a substrate, that the solder tabs are disposed on. In some embodiments, winding portions 924, 926 and ground return conductor portions 928 are flexible. In certain alternate embodiments of assembly 300 including bridge inductor 900 in place of bridge inductor 318, solder tabs 922, 923 are electrically coupled to substrate conductors such that current flowing from load 304 back to switching circuit 316 flows through ground return conductor 910 from second solder tabs 923 to first solder tabs 922.

The fact that winding 908 is a staple-style winding promotes inductor manufacturing simplicity, particularly in embodiments where magnetic core 902 is formed of a ferrite magnetic material. However, the configuration of winding 908 can be modified without departing from the scope hereof. For example, in some alternate embodiments, winding 908 is a multi-turn winding embedded in magnetic core 902. Certain of these alternate embodiments are formed, for example, by placing winding 908 in a mold, disposing a magnetic material around the winding in the mold, and curing the material, such as by applying pressure, heat, and/or curing agents to the magnetic material, to form a molded magnetic core with winding 908 embedded therein. Ground return conductor 910 is optionally placed in the mold with winding 908 before disposing the magnetic material in the mold, such that both winding 908 and ground return conductor 910 are embedded in magnetic core 902 at the same time. Embedding winding 908 in magnetic core 902 concurrently with ground return conductor 910 promotes manufacturing simplicity and ease of aligning solder tabs 914, 920 with solder tabs 922, 923. The magnetic material disposed in the mold is, for instance, powdered iron within a binder.

Figure 13:
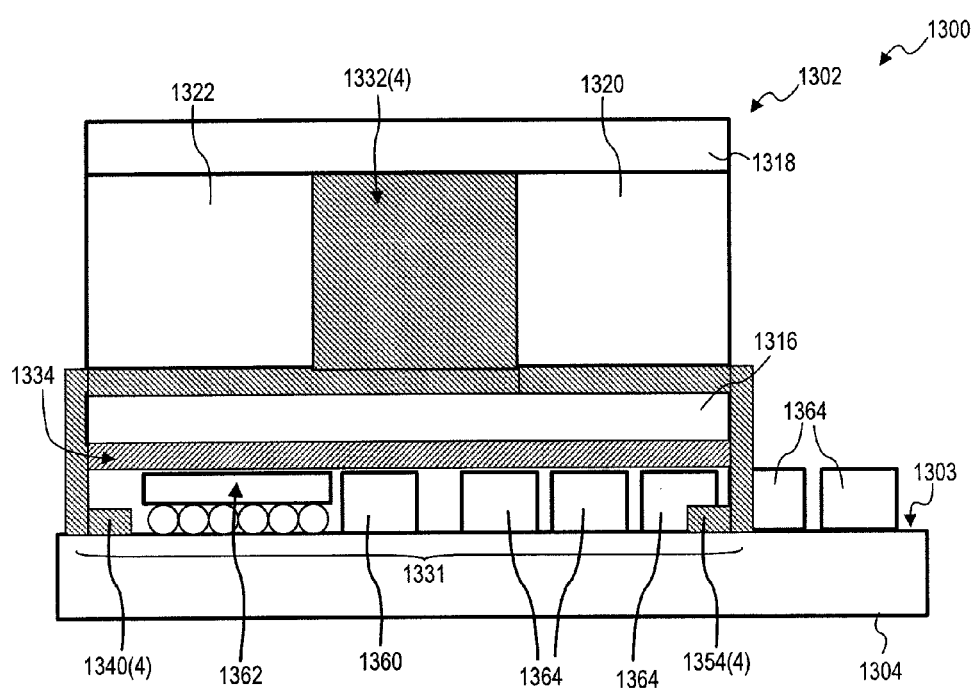
FIG. 13 shows an end elevational view of an electrical assembly including a bridge coupled inductor disposed on a substrate, according to an embodiment.

Bridge inductors can also be used in coupled inductor applications, where a coupled inductor is a magnetic device adapted to achieve both energy transfer and energy storage. For example, FIG. 13 shows an end elevational view of an electrical assembly 1300 including a bridge coupled inductor 1302 disposed on an outer surface 1303 of a substrate 1304. Bridge coupled inductor 1302 forms part of a switching power converter, as discussed below.

Figure 14:
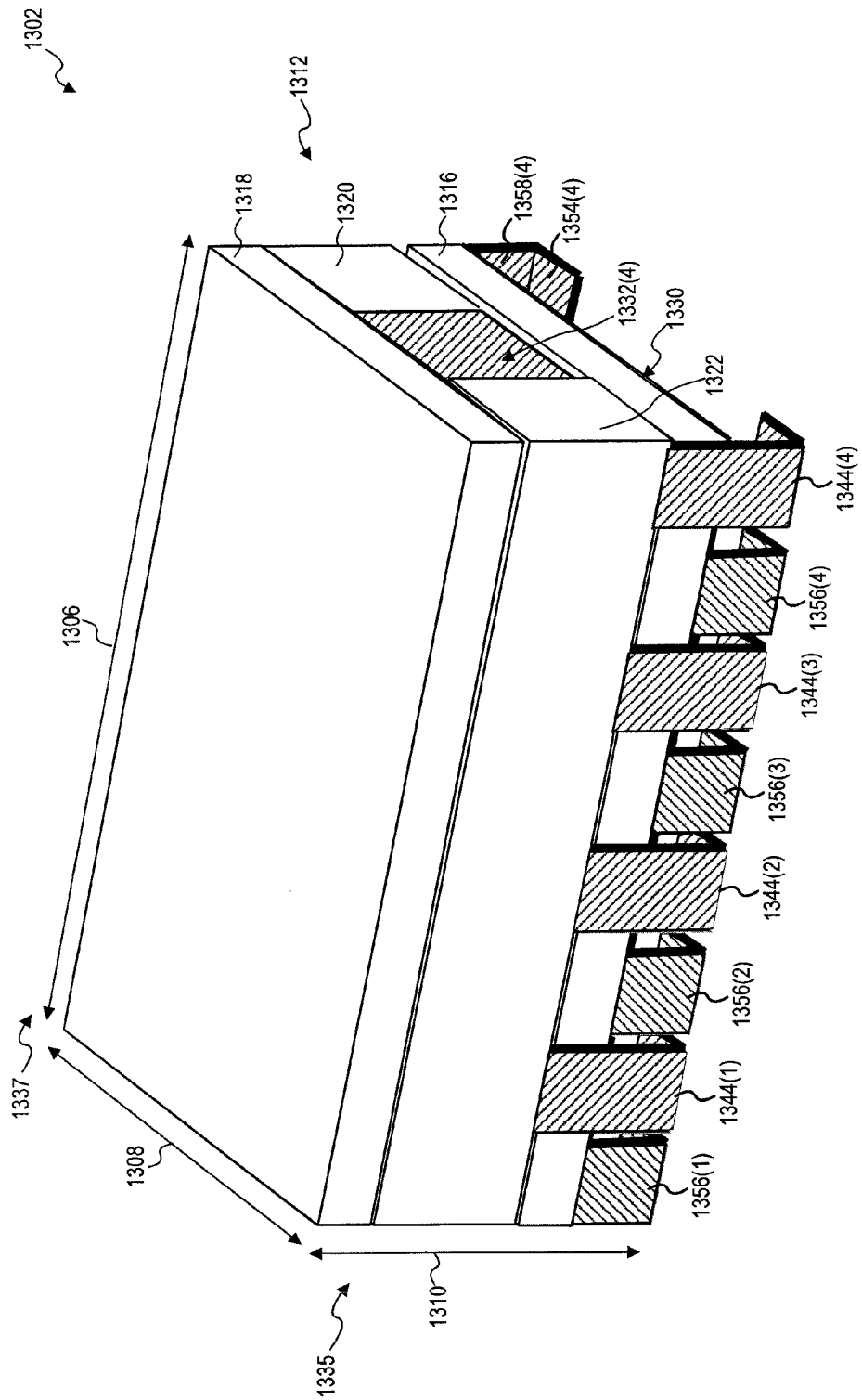
FIG. 14 shows a perspective view of the bridge coupled inductor of the FIG. 13 electrical assembly.
Figure 15:
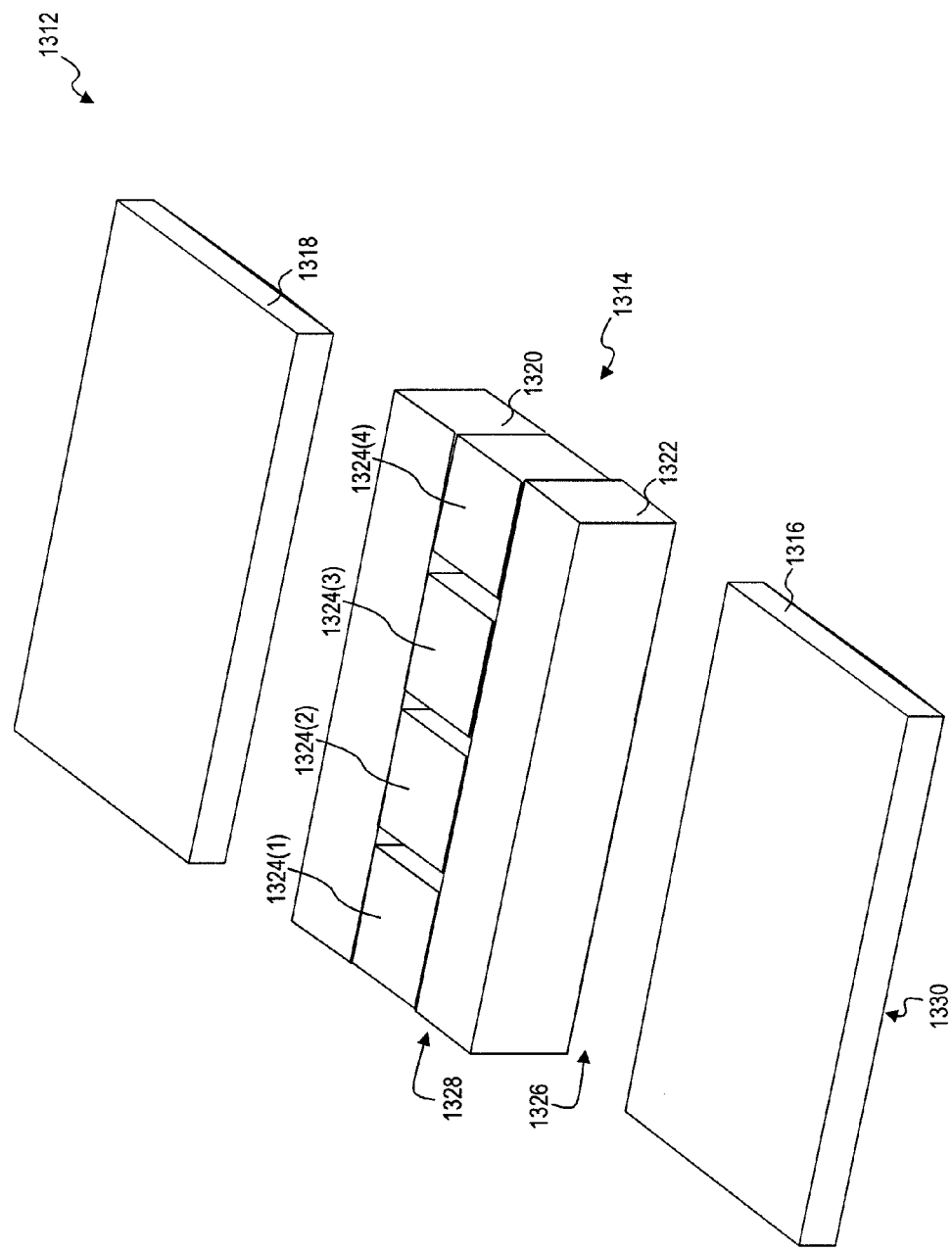
FIG. 15 shows an exploded perspective view of the magnetic core of the bridge coupled inductor of the FIG. 13 electrical assembly.

FIG. 14 shows a perspective of bridge coupled inductor 1302, which has a width 1306, a depth 1308, and a height 1310. Bridge coupled inductor 1302 includes a magnetic core 1312 including a ladder structure 1314 and first and second leakage plates 1316, 1318. FIG. 15 shows an exploded perspective view of magnetic core 1312 with first and second leakage plates 1316, 1318 separated from ladder structure 1314. Ladder structure 1314 includes first and second rails 1320, 1322, and N rungs 1324, where N is an integer greater than one. Each rung 1324 is disposed between and connects first and second rails 1320, 1322. In some embodiments, first and second rails 1320, 1322 are disposed parallel to each other, as shown. Ladder structure has 1314 opposing first and second sides 1326, 1328.

First leakage plate 1316 is disposed on first side 1326 of ladder structure 1314 under each of the N rungs 1324, such that first leakage plate 1316 connects first and second rails 1320, 1322. First leakage plate 1316 also forms a first outer surface 1330 of magnetic core 1312 disposed over and facing a first portion 1331 of substrate outer surface 1303. Second leakage plate 1318 is disposed on second side 1328 of ladder structure 1314 over each of the N rungs 1324 such that second leakage plate 1318 connects first and second rails 1320, 1322. First and second leakage plates 1316, 1318 are each typically separated from ladder structure 1314 by material having a lower magnetic permeability than a one or more materials forming magnetic core 1312. For example, in some embodiments, air, plastic, paper, and/or adhesive separates each of first and second leakage plates 1316, 1318 from ladder structure 1314.

Figure 16:
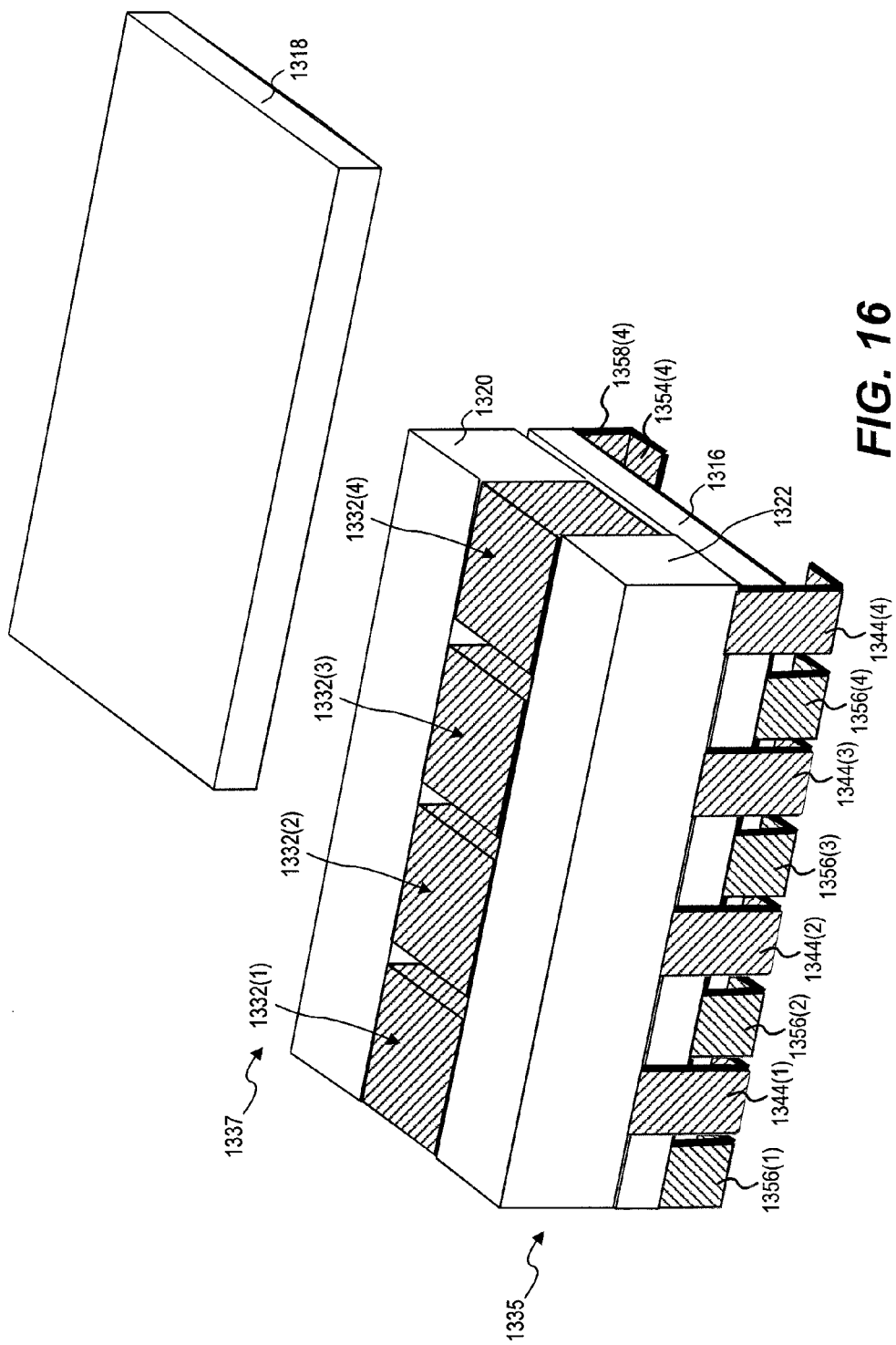
FIG. 16 shows an exploded perspective view of the bridge coupled inductor of the FIG. 13 electrical assembly, with a second leakage plate separated from the remainder of the inductor.
Figure 17:
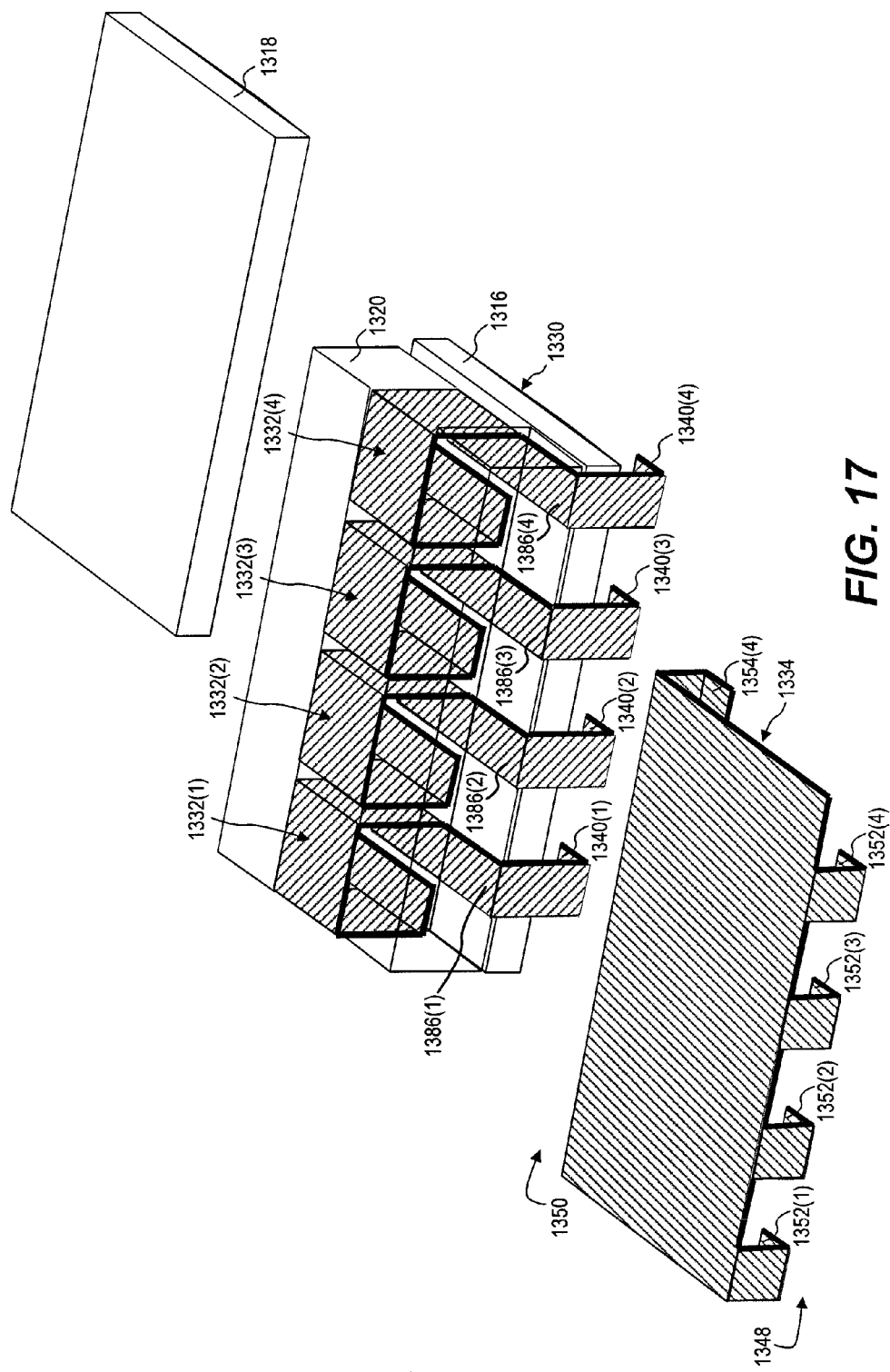
FIG. 17 shows an exploded perspective view of the bridge coupled inductor of the FIG. 13 electrical assembly, with a ground return conductor and the second leakage plate separated from the remainder of the inductor.
Figure 18:
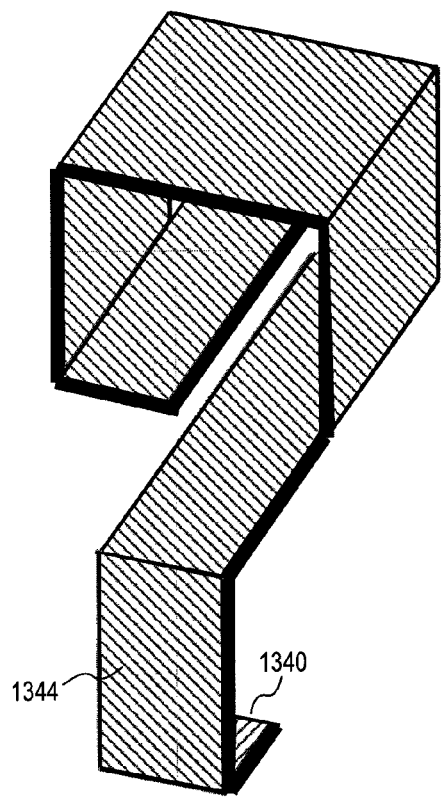
FIGS. 18-20 respectively show a perspective view, a top plan view, and a side elevational view, of one instance of the bridge coupled inductor windings of the FIG. 13 electrical assembly.
Figure 19:
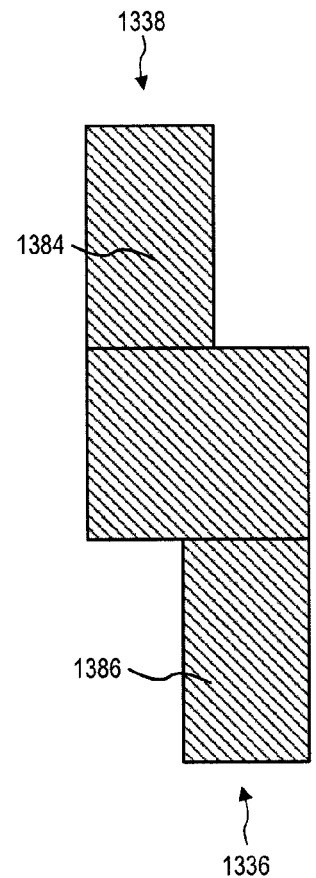
Figure 20:
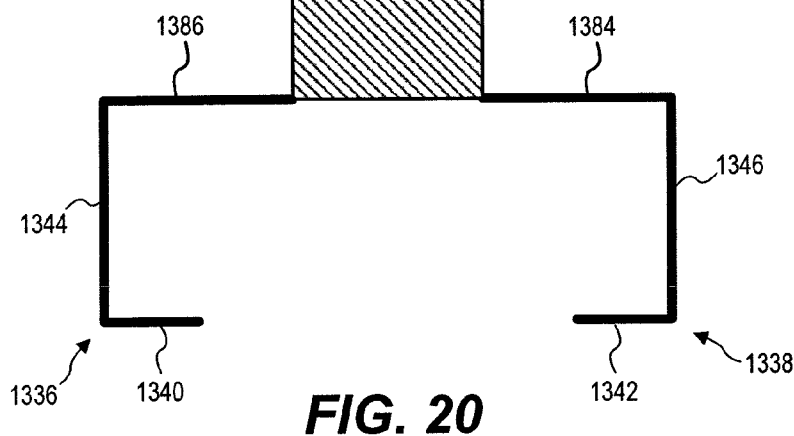

Bridge coupled inductor 1304 further includes a respective winding 1332 wound around each of the N rungs 1324, and a ground return conductor 1334 disposed on magnetic core first outer surface 1330. In some embodiments, ground return conductor 1334 extends from a first side 1335 of magnetic core 1312 to a second side 1337 of magnetic core 1312 on first outer surface 1330, as shown. Although windings 1332 have a common configuration in bridge inductor 1302, in some alternate embodiments, two or more windings have different configurations, such as to create an embodiment with asymmetrical leakage inductance values. FIG. 16 shows an exploded perspective view of bridge inductor 1302 with second leakage plate 1318 separated from the remainder of inductor 1302 to show the tops of windings 1332. FIG. 17 shows another exploded perspective view of inductor 1302, but with both of ground return conductor 1334 and second leakage plate 1318 separated from the remainder of inductor 1302. Second rail 1322 and the N rungs 1324 are shown as transparent in FIG. 17 to better show the N windings 1332. FIGS. 18-20 respectively show a perspective view, a top plan view, and a side elevational view, of one instance of windings 1332.

Opposing ends 1336, 1338 of each winding 1332 form a respective solder tab 1340, 1342 surface mount soldered to conductors of substrate 1304. Solder tabs 1340, 1342 face, but are offset from, magnetic core outer surface 1330. In some alternate embodiments, though, one or more of solder tabs 1340, 1342 are supplemented with or replaced by an alternative connector, such as a through-hole pin or a socket pin. Each winding 1332 also forms two stand-offs 1344, 1346 adapted to offset magnetic core 1312 from first portion 1331 of substrate outer surface 1303. In some embodiments, stand-offs 1344, 1346 are formed of flexible metallic foil such that the stand-offs are flexible.

Magnetic core 1312 does not form a magnetic path loop around ground return conductor 1334. Ground return conductor 1334 has opposing first and second sides 1348, 1350, as shown in FIG. 17. Ground return conductors 1334 forms N first solder tabs 1352 on first side 1348, and N second solder tabs 1354 on second side 1350, although only one instance of solder tab 1354 is visible in the shown views. First and second solder tabs 1352, 1354 are surface mount soldered to conductors of substrate 1304. In some alternate embodiments, however, one or more of solder tabs 1352, 1354 are supplemented with or replaced by an alternative connector, such as a through-hole pin or a socket pin. Additionally, the number of first and/or second solder tabs 1352, 1354 may be varied without departing from the scope hereof. Ground return conductor 1334 also forms a stand-off 1356 with each first solder tab 1352 and a stand-off 1358 with each second solder tab 1354. Stand-offs 1356, 1358 are adapted to offset magnetic core 1312 from substrate 1304. In some embodiments, stand-offs 1356, 1358 are formed of flexible metallic foil such that the stand-offs are flexible.

First solder tabs 1340 of windings 1332 are interleaved with first solder tabs 1352 of ground return conductor 1334. Similarly, second solder tabs 1342 of windings 1332 are interleaved with second solder tabs 1354 of ground return conductor 1334. Such interleaving reduces the size of a current loop including bridge coupled inductor 1302, as discussed further below.

Ladder structure 1314 magnetically couples the N windings 1332, while first and second leakage plates 1316, 1318 provide leakage magnetic flux paths for windings 1332, such that each winding 1332 has an associated leakage inductance. Leakage inductance values are adjusted during the design of inductor 1302, for example, by varying a separation distance between first leakage plate 1316 and ladder structure 1314, and/or by varying a separation distance between second leakage plate 1318 and ladder structure 1314. Magnetic coupling of windings 1332 is associated with transfer of energy between windings, while leakage inductance of windings 1332 is associated with energy storage in inductor 1302.

Figure 21:
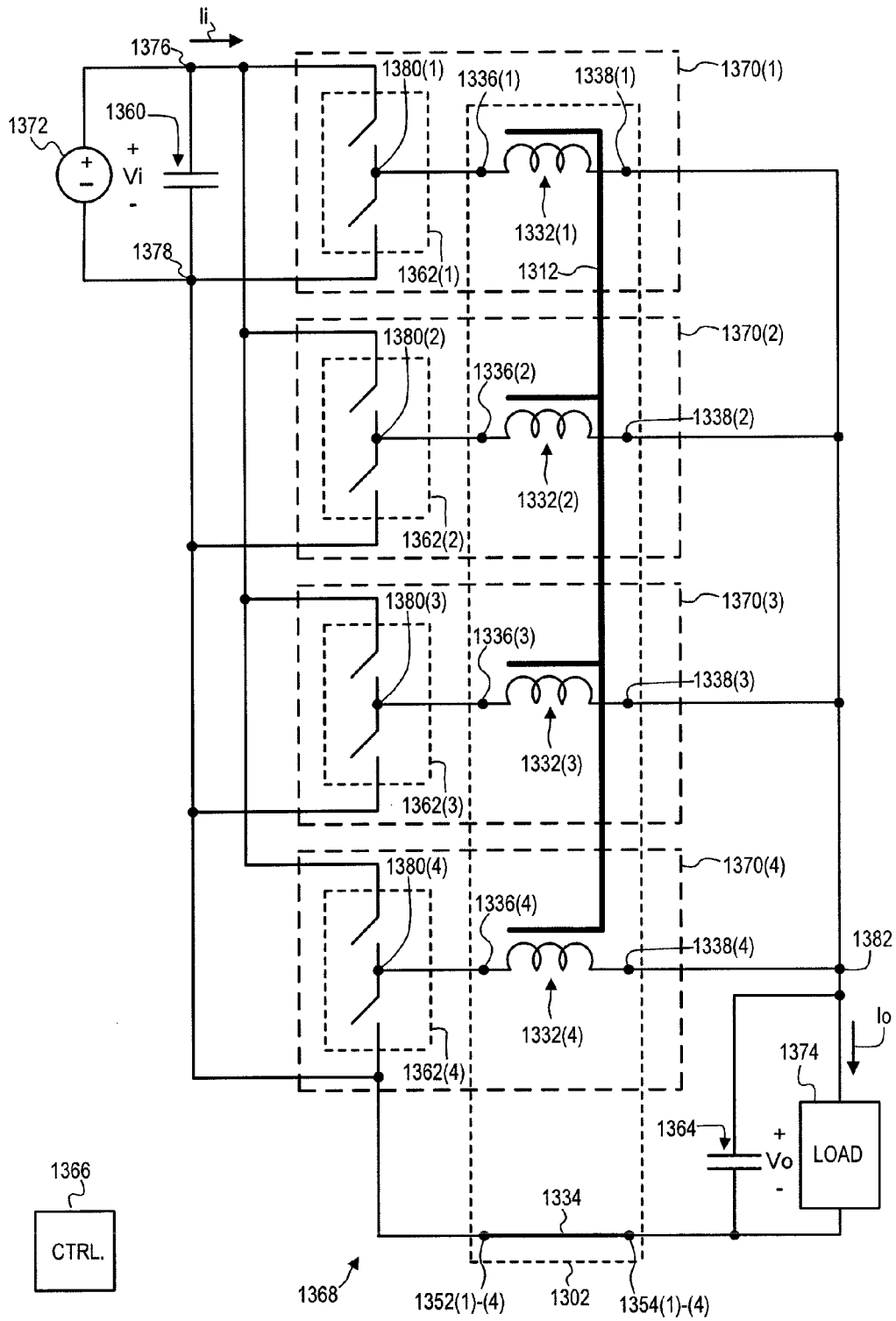
FIG. 21 shows an electrical schematic of the FIG. 13 electrical assembly.

FIG. 21 shows an electrical schematic of assembly 1300. Assembly 1300 further includes input capacitors 1360, N switching circuits 1362, output capacitors 1364, and a controller 1366. These components, along with bridge inductor 1302, form part of a buck converter 1368 including multiple parallel power stages 1370 adapted to transfer power from an input power source 1372 to a load 1374. In certain embodiments, one or more of input capacitors 1360 and output capacitors 1364 are multi-layer ceramic capacitors. In some embodiments, load 1374 is a processor of an information technology device. Controller 1366, input power source 1372, and load 1374 are not shown in FIG. 13, and these components may be integrated with assembly 1300 or external to assembly 1300. At least some of switching circuits 1362, input capacitors 1360, and output capacitors 1364 are disposed on substrate outer surface portion 1331, between substrate 1304 and ground return conductor 1334, such that inductor 1302 bridges these components. Thus, ground return conductor 1334 is disposed between at least some of these components and magnetic core 1312.

Although only a single input capacitor 1360 is visible in the elevational view of FIG. 13, it is anticipated that assembly 1300 will typically include a number of input capacitors electrically coupled in parallel, which are symbolically shown as a single capacitor in the FIG. 21 schematic. Additionally, although FIG. 13 shows five output capacitors 1364, the number of output capacitors may be varied without departing from the scope hereof. Output capacitors 1364 are electrically coupled in parallel and are symbolically shown as a single capacitor in the FIG. 21 schematic.

Each power stage 1370 includes a respective one of the N switching circuits 1362 electrically coupled across input and common power nodes 1376, 1378. Input capacitors 1360 and input power source 1372 are also electrically coupled across nodes 1376, 1378. Each power stage 1370 further includes a respective one of the N windings 1332 of bridge coupled inductor 1302 electrically coupled between a switching node 1380 of the power stage and an output power node 1382. Output capacitors 1364 are electrically coupled between output and common power nodes 1382, 1378. Controller 1366 controls each switching circuit 1362 to repeatedly switch its respective winding first end 1336 between at least two voltage levels corresponding to the voltages on input and common power nodes 1376, 1378, to transfer power from input power source 1372 to load 1374. In some embodiments, controller 1366 is adapted to control switching circuits 1362 so that they switch out of phase with respect to each other, such that each power stage 1370 may considered a "phase," and buck converter 1368 may be considered a "multi-phase" buck converter. Additionally, in certain embodiments, controller 1366 is adapted to control switching of switching circuits 1362 to regulate input voltage Vi, input current Ii, input power, output voltage Vo, output current Io, and/or output power. Controller 1366 typically is adapted to cause switching circuits 1362 to switch at a frequency of 20 kilohertz or greater to promote low ripple current magnitude, fast converter transient response, and/or operation outside of a frequency range perceivable by humans.

Certain embodiments of electrical assembly 1300 will potentially achieve some or all of the advantages discussed above with respect to electrical assembly 300 of FIG. 3. For example, use of bridge coupled inductor 1302 in place of a conventional coupled inductor promotes small assembly size by allowing components to be placed between substrate 1304 and magnetic core 1312, as shown in FIG. 13. Additionally, bridge inductor 1302 advantageously protects the components it bridges from mechanical stress. Inclusion of ground return conductor 1334 in bridge coupled inductor 1302 also promotes low losses, electromagnetic compatibility, and the ability to dispose sensitive components under bridge inductor 1302, in a manner similar to that discussed above with respect to assembly 300. While inclusion of ground return conductor 1334 potentially offers significant benefits, it is omitted in some alternate embodiments to reduce cost and/or complexity.

The configuration of bridge coupled inductor 1302 also offers a number of potential advantages. For example, leakage inductance values can be readily adjusted during the design of inductor 1302 by varying spacing between leakage plates 1316, 1318 and ladder structure 1314, as discussed above. Additionally, leakage plates 1316, 1318 help shield other electrical circuitry from magnetic and electric fields generated by current flowing through windings 1332. Specifically, a respective portion 1384 of each winding 1332 is disposed between first rail 1320 and first leakage plate 1316, and a respective portion 1386 of each winding 1332 is disposed between second rail 1322 and first leakage plate 1316, such that winding portions 1384, 1386 are shielded by first leakage plate 1316. Second leakage plate 1318 also shields tops of windings 1332. However, in some alternate embodiments, one of first and second leakage plates 1316, 1318 is omitted to reduce cost and complexity. Additionally, in some other alternate embodiments, first and second leakage plates 1316, 1318 are replaced with other means to achieve leakage magnetic flux paths, such as gapped outer legs, as taught, for example, in U.S. Patent Application Publication Number 2009/0237197 to Ikriannikov et al., which is incorporated herein by reference.

Figure 22:
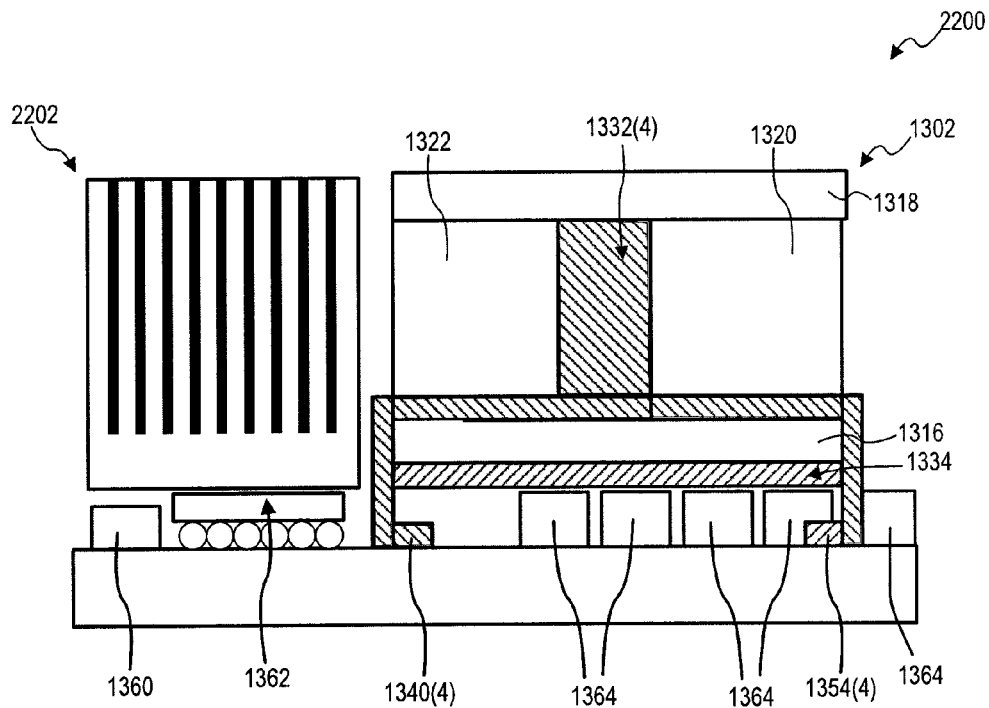
FIG. 22 shows a side elevational view of an electrical assembly, which is similar to the assembly of FIG. 13, but with switching circuits and input capacitors disposed next to the bridge inductor, according to an embodiment.

Although FIGS. 13-21 show N being four, assembly 1300 may be modified so that N is any integer greater than one. For example, the value of N may be selected during the design of assembly 1300 at least partially based on the expected magnitude of current required by load 1374, since current capacity of buck converter 1368 is somewhat proportional to number of power stages 1370. Additionally, in some alternate embodiments, ground return conductor 1334 is supplemented by one or more conductors on substrate 1304, such as to increase converter capacity, with a possible diminishment of advantages associated with using ground return conductor 1334. Furthermore, the number, type, and placement of components in assembly 1300 may be varied without departing from the scope hereof. For example, in some alternate embodiments, controller 1366 is replaced with a number of discrete controllers disposed at different locations on assembly 1300, such as one controller for each power stage 1370. As another example, FIG. 22 shows an end elevational view of an electrical assembly 2200, which is similar to assembly 1300 of FIG. 13, but with switching circuits 1362 and input capacitors 1360 disposed next to bridge inductor 1302, instead of under bridge inductor 1302. This alternate location of switching circuits 1362 allows an optional heat sink 2202 to be attached to each switching circuit 1362, as shown.

Moreover, assembly 1300 could be modified to replace bridge coupled inductor 1302 with one or more alternate inductors. For example, in some alternate embodiments where N is equal to four, bridge inductor 1302 is replaced with two separate bridge coupled inductors, where each bridge coupled inductor includes two windings and supports a respective pair of the four power stages 1370. As another example, in some other alternate embodiments, bridge inductor 1302 is replaced with N discrete (non-coupled) inductors, such as N instances of bridge inductor 900 of FIG. 9, where each inductor 900 bridges a respective one of the N switching circuits 1362.

Although bridge inductors are discussed above with respect to buck converter applications, bridge inductors can also be used with other switching converter topologies. For example, assembly 300 of FIG. 3 could be modified such that buck converter 302 is instead a boost or a buck-boost converter. Similarly, assembly 1300 of FIG. 13 could be modified such that multi-power stage buck converter 1368 is instead a multi-power stage boost converter or buck-boost converter.

Figure 23:
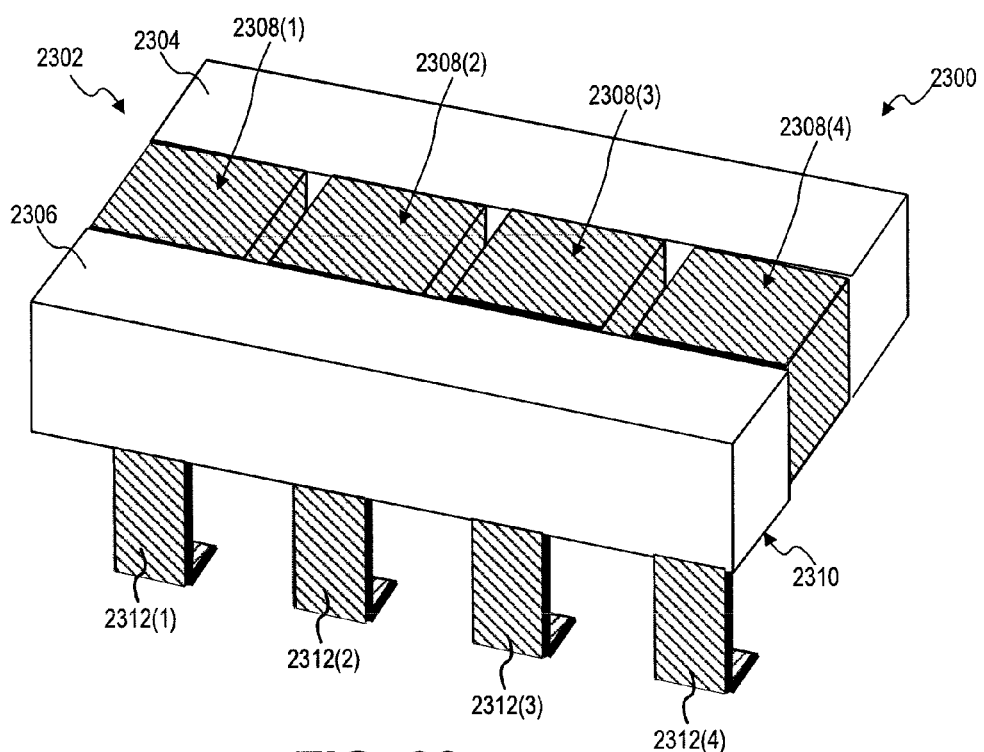
FIG. 23 shows a perspective view of a bridge transformer, according to an embodiment.

Furthermore, the principles discussed above with respect to bridge inductors could also be applied to bridge transformers, which include a magnetic core adapted to be offset from a substrate that the transformer is disposed on. For example, FIG. 23 shows a perspective view of a bridge transformer 2300. Bridge transformer includes a magnetic core 2302 having a ladder structure similar to ladder structure 1314 of FIG. 15. Specifically, magnetic core 2302 includes first and second rails 2304, 2306 and N rungs (not visible in FIG. 22) disposed between and connecting rails 2304, 2306, where N is an integer greater than one. A respective winding 2308 is wound around each rung. Windings 2308 are similar to windings 1332 of assembly 1300. For example, opposing ends of each winding 2308 form a respective solder tab adapted for surface mount soldering to a substrate conductor. A ground return conductor, such as one similar to ground return conductor 1334 of assembly 1300, is optionally disposed on an outer surface 2310 of magnetic core 2302. Magnetic core 2302 does not, however, include leakage plates, since leakage inductance is typically undesirable in transformers.

Bridge transformer 2300 is, for example, disposed on an outer surface of a substrate in a manner similar to that discussed above with respect to bridge inductors. In such applications, windings 2308 form stand-offs 2312 adapted to offset magnetic core 2302 from a portion of the substrate outer surface that transformer 2300 is disposed on. Electrical components are, for instance, disposed on the substrate outer surface between the substrate and the magnetic core, such that bridge transformer 2300 bridges the components.

Combinations of Features

Features described above as well as those claimed below may be combined in various ways without departing from the scope hereof. The following examples illustrate some possible combinations:

(A1) An electrical assembly may include a substrate and a bridge magnetic device disposed on an outer surface of the substrate. The bridge magnetic device may include (1) a magnetic core disposed over and offset from a first portion of the outer surface of the substrate, (2) N windings wound around at least a portion of the magnetic core and electrically coupled to conductors of the substrate, where N is an integer greater than zero, and (3) a ground return conductor disposed on an outer surface of the magnetic core facing the first portion of the outer surface of the substrate. The electrical assembly may further include at least one electrical component disposed on the first portion of the outer surface of the substrate.

(A2) In the electrical assembly denoted as (A1), at least one of the N windings may form one or more stand-offs adapted to offset the magnetic core from the outer surface of the substrate.

(A3) In either of the electrical assemblies denoted as (A1) or (A2), opposing ends of at least one of the N windings may form solder tabs surface mount soldered to conductors of the substrate.

(A4) In any of the electrical assemblies denoted as (A1) through (A3), the ground return conductor may form at least one additional stand-off adapted to offset the magnetic core from the outer surface of the substrate.

(A5) In any of the electrical assemblies denoted as (A1) through (A4), the ground return conductor may be electrically coupled to electrical conductors of the substrate.

(A6) In any of the electrical assemblies denoted as (A1) through (A5), the magnetic core optionally does not form a magnetic path loop around the ground return conductor.

(A7) In any of the electrical assemblies denoted as (A1) through (A6), the bridge magnetic device may be selected from the group consisting of a bridge inductor and a bridge transformer.

(A8) In any of the electrical assemblies denoted as (A1) through (A6), the bridge magnetic device may be an inductor, and the inductor and the at least one electrical component may collectively form at least part of a switching power converter.

(A9) In the electrical assembly denoted as (A8), the switching power converter may be a buck-type converter, and the at least one electrical component may include at least one output capacitor.

(A10) In the electrical assembly denoted as (A9), the at least one output capacitor may include at least one multi-layer ceramic capacitor.

(A11) In either of the electrical assemblies denoted as (A9) or (A10), the at least one electrical component may further include at least one input capacitor.

(A12) In any of the electrical assemblies denoted as (A8) through (A11), the at least one electrical component may further include a switching circuit.

(A13) The electrical assembly denoted as (A12) may further include a heat transfer device adapted to transfer heat from the switching circuit to the ground return conductor.

(A14) In any of the electrical assemblies denoted as (A8) through (A13), N may be an integer greater than one, and the switching power converter may be a multi-phase switching power converter.

(A15) In the electrical assembly denoted as (A14), the ground return connector may include a plurality of solder tabs electrically coupled to conductors of the substrate, opposing ends of each of the N windings may form a respective solder tab electrically coupled to conductors of the substrate, and the plurality of solder tabs of the ground return conductor may be interleaved with the solder tabs of the N windings.

(A16) Any of the electrical assemblies denoted as (A8) through (A15) may further include a controller adapted to at least partially control operation of the switching power converter, and the controller may be disposed on the first portion of the outer surface of the substrate.

(A17) In any of the electrical assemblies denoted as (A8) through (A16): (1) N may be an integer greater than one; (2) the magnetic core may include (a) a ladder structure including first and second rail and N rungs, each of the N rungs connecting the first and second rails, (b) a first leakage plate disposed on a first side of the ladder structure under each of the N rungs, the first leakage plate connecting the first and second rails and forming the outer surface of the magnetic core facing the first portion of the outer surface of the substrate, and (c) a second leakage plate disposed on a second side of the ladder structure over each of the N rungs, the second side of the ladder structure being opposite to the first side of the ladder structure, the second leakage plate connecting the first and second rails; and (3) each of the N windings may be wound around a respective one of the N rungs.

(A18) In the electrical assembly denoted as (A17), a respective first portion of each of the N windings may be disposed between the first rail and the first leakage plate, and a respective second portion of each of the N windings may be disposed between the second rail and the first leakage plate.

(A19) Any of the electrical assemblies denoted as (A8) through (A18) may further include N switching circuits, each of the N switching circuits may be adapted to repeatedly switch a first end of a respective one of the N windings between at least two different voltage levels, and the ground return conductor may be electrically coupled between the N switching circuits and a load powered by the switching power converter to provide a path for current flowing from the load to the N switching circuits.

(A20) In any of the electrical assemblies denoted as (A8) through (A19), the magnetic core may have opposing first and second sides, and the ground return conductor may extend from the first side to the second side of the magnetic core, on the outer surface of the magnetic core.

(A21) In the electrical assembly denoted as (A20), the outer surface of the magnetic core may connect the first and second sides of the magnetic core.

(B1) An electrical assembly may include a substrate, at least one electrical component disposed on the substrate, and a bridge magnetic device disposed on the substrate. The bridge magnetic device may include a magnetic core and a ground return conductor arranged such that: (1) the at least one electrical component is disposed between the substrate and the ground return conductor, and (2) the ground return conductor is disposed between the at least one electrical component and the magnetic core.

(B2) In the electrical assembly denoted as (B1), the bridge magnetic device may further include N windings wound around at least a portion of the magnetic core, and at least one of the N windings may form one or more stand-offs adapted to offset the magnetic core from the substrate, where N is an integer greater than zero.

(B3) In the electrical assembly denoted as (B2), the ground return conductor may form at least one additional stand-off adapted to offset the magnetic core from the outer surface of the substrate.

(B4) In either of the electrical assemblies denoted as (B2) or (B3), N may be an integer greater than one, the ground return connector may include a plurality of solder tabs electrically coupled to conductors of the substrate, opposing ends of each of the N windings may form a respective solder tab electrically coupled to conductors of the substrate, and the plurality of solder tabs of the ground return conductor may be interleaved with the solder tabs of the N windings.

(B5) Any of the electrical assemblies denoted as (B2) through (B4) may further include N switching circuits, where each of the N switching circuits is adapted to repeatedly switch a first end of a respective one of the N windings between two different voltage levels.

(B6) In the electrical assembly denoted as (B5), the bridge magnetic device and the N switching circuits may form at least part of a switching power converter.

(B7) In the electrical assembly denoted as (B6), the ground return conductor may be electrically coupled between the N switching circuits and a load powered by the switching power converter, to provide a path for current flowing from the load to the N switching circuits.

(B8) In any of the electrical assemblies denoted as (B2) through (B7), opposing ends of at least one of the N windings may form solder tabs surface mount soldered to conductors of the substrate.

(B9) In any of the electrical assemblies denoted as (B1) through (B8), the magnetic core optionally does not form a magnetic path loop around the ground return conductor.

(B10) In any of the electrical assemblies denoted as (B1) through (B9), the bridge magnetic device may be selected from the group consisting of a bridge inductor and a bridge transformer.

(B11) In any of the electrical assemblies denoted as (B1) through (B10), the magnetic core may have opposing first and second sides, and the ground return conductor may extend from the first side to the second side of the magnetic core.

(C1) An electrical assembly may include a substrate and a bridge inductor disposed on an outer surface of the substrate. The bridge inductor may include (1) a magnetic core offset from and disposed over a first portion of the outer surface of the substrate, and (2) a winding wound around at least a portion of the magnetic core, where the winding has opposing first and second ends electrically coupled to conductors of the substrate. The electrical assembly may further include a switching circuit, a plurality of capacitors, and a load. The switching circuit may be operable to repeatedly switch the first end of the winding between at least two different voltage levels. The plurality of capacitors may be disposed on the first portion of the outer surface of the substrate, and the plurality of capacitors may be electrically coupled to the second end of the winding. The load may be disposed on the substrate proximate to the second end of the winding, and the load may be electrically coupled to the second end of the winding. The bridge inductor, the switching circuit, and the plurality of capacitors may collectively form at least part of a switching power converter operable to at least partially power the load.

(C2) In the electrical assembly denoted as (C1), the magnetic core may have opposing first and second sides, the first end of the winding may terminate at the first side of the magnetic core, the second end of the winding may terminate at the second side of the magnetic core, and the load may be disposed at the second side of the magnetic core.

(C3) In either of the electrical assemblies denoted as (C1) or (C2), the load may include a processor of an information technology device.

(C4) In any of the electrical assemblies denoted as (C1) through (C3), the first and second ends of the winding may form respective first and second solder tabs surface mount soldered to conductors of the substrate.

(C5) In any of the electrical assemblies denoted as (C1) through (C4), the switching circuit may be disposed on the first portion of the outer surface of the substrate.

(C6) In any of the electrical assemblies denoted as (C1) through (C5), the bridge inductor may further include a ground return conductor disposed on an outer surface of the magnetic core facing the first portion of the outer surface of the substrate, and the ground return conductor may be electrically coupled to conductors of the substrate.

(C7) In the electrical assembly denoted as (C6), the magnetic core optionally does not form a magnetic path loop around the ground return conductor.

(C8) In either of the electrical assemblies denoted as (C6) or (C7), the ground return conductor may be adapted to carry current flowing from the load to the switching circuit.

(D1) An electrical assembly may include a substrate and a bridge magnetic device disposed on an outer surface of the substrate. The bridge magnetic device may include (1) a magnetic core disposed over a first portion of the outer surface of the substrate, and (2) N windings wound around at least a portion of the magnetic core, where N is an integer greater than zero. The N windings may form one or more flexible stand-offs offsetting the magnetic core from the first portion of the outer surface of the substrate, where the one or more flexible stand-offs allow the magnetic core to move with respect to the substrate. The electrical assembly may further include at least one electrical component disposed over the first portion of the outer surface of the substrate.

(D2) In the electrical assembly denoted as (D1), the bridge magnetic device may further include a ground return conductor disposed on an outer surface of the magnetic core facing the first portion of the outer surface of the substrate, and the ground return conductor may be electrically coupled to conductors of the substrate.

(D3) In the electrical assembly denoted as (D2), the ground return conductor may form one or more additional flexible stand-offs offsetting the magnetic core from the first portion of the outer surface of the substrate, where the one or more additional flexible stand-offs allow the magnetic core to move with respect to the substrate.

(D4) In either of the electrical assemblies denoted as (D2) or (D3), the magnetic core optionally does not form a magnetic path loop around the ground return conductor.

(D5) In any of the electrical assemblies denoted as (D1) through (D4), the bridge magnetic device may be selected from the group consisting of a bridge inductor and a bridge transformer.

Changes may be made in the above methods and systems without departing from the scope hereof. For example, single-turn windings may be replaced with multiple-turn windings in many embodiments. As another example, magnetic cores formed of discrete magnetic elements may be replaced with monolithic magnetic cores, such as cores formed of molded powder magnetic material. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. An electrical assembly, comprising:
    a substrate;
    a bridge magnetic device disposed on an outer surface of the substrate, the bridge magnetic device including:
        a magnetic core disposed over and offset from a first portion of the outer surface of the substrate in a first direction,
        N windings wound around at least a portion of the magnetic core and electrically coupled to conductors of the substrate, N being an integer greater than zero, and
        a ground return conductor disposed on an outer surface of the magnetic core facing the first portion of the outer surface of the substrate in the first direction; and
    at least one electrical component disposed on the first portion of the outer surface of the substrate, such that the at least one electrical component is disposed in the first direction between the outer surface of the substrate and the bridge magnetic device.

2. The electrical assembly of claim 1, at least one of the N windings forming one or more stand-offs adapted to offset the magnetic core from the outer surface of the substrate.

3. The electrical assembly of claim 2, opposing ends of at least one of the N windings forming solder tabs surface mount soldered to conductors of the substrate.

4. The electrical assembly of claim 2, the ground return conductor forming at least one additional stand-off adapted to offset the magnetic core from the outer surface of the substrate.

5. The electrical assembly of claim 1, the ground return conductor being electrically coupled to electrical conductors of the substrate.

6. The electrical assembly of claim 5, the magnetic core not forming a magnetic path loop around the ground return conductor.

7. The electrical assembly of claim 1, the bridge magnetic device being an inductor, the inductor and the at least one electrical component collectively forming at least part of a switching power converter.

8. The electrical assembly of claim 7, the switching power converter being a buck-type converter, the at least one electrical component comprising at least one output capacitor.

9. The electrical assembly of claim 8, the at least one output capacitor comprising at least one multi-layer ceramic capacitor.

10. The electrical assembly of claim 8, the at least one electrical component further comprising at least one input capacitor.

11. The electrical assembly of claim 10, the at least one electrical component further comprising a switching circuit.

12. The electrical assembly of claim 11, further comprising a heat transfer device adapted to transfer heat from the switching circuit to the ground return conductor.

13. The electrical assembly of claim 7, N being an integer greater than one, the switching power converter being a multi-phase switching power converter.

14. The electrical assembly of claim 13, the ground return connector comprising a plurality of solder tabs electrically coupled to conductors of the substrate, opposing ends of each of the N windings forming a respective solder tab electrically coupled to conductors of the substrate, the plurality of solder tabs of the ground return conductor being interleaved with the solder tabs of the N windings.

15. The electrical assembly of claim 7, further comprising a controller adapted to at least partially control operation of the switching power converter, the controller being disposed on the first portion of the outer surface of the substrate.

16. The electrical assembly of claim 7:
N being an integer greater than one;
the magnetic core comprising:
(a) a ladder structure including first and second rail and N rungs, each of the N rungs connecting the first and second rails,
(b) a first leakage plate disposed on a first side of the ladder structure under each of the N rungs, the first leakage plate connecting the first and second rails and forming the outer surface of the magnetic core facing the first portion of the outer surface of the substrate, and
(c) a second leakage plate disposed on a second side of the ladder structure over each of the N rungs, the second side of the ladder structure being opposite to the first side of the ladder structure, the second leakage plate connecting the first and second rails; and
each of the N windings being wound around a respective one of the N rungs.

17. The electrical assembly of claim 16, a respective first portion of each of the N windings being disposed between the first rail and the first leakage plate, and a respective second portion of each of the N windings being disposed between the second rail and the first leakage plate.

18. The electrical assembly of claim 7, further comprising N switching circuits, each of the N switching circuits adapted to repeatedly switch a first end of a respective one of the N windings between at least two different voltage levels, the ground return conductor electrically coupled between the N switching circuits and a load powered by the switching power converter to provide a path for current flowing from the load to the N switching circuits.

19. The electrical assembly of claim 1, the bridge magnetic device being selected from the group consisting of a bridge inductor and a bridge transformer.

20. The electrical assembly of claim 1, the magnetic core having opposing first and second sides, the ground return conductor extending from the first side to the second side of the magnetic core, on the outer surface of the magnetic core.

21. The electrical assembly of claim 20, the outer surface of the magnetic core connecting the first and second sides of the magnetic core.

22. An electrical assembly, comprising:
a substrate;
at least one electrical component disposed on the substrate; and
a bridge magnetic device disposed on the substrate, the bridge magnetic device including
a magnetic core and a ground return conductor arranged such that:
the at least one electrical component is disposed between the substrate and the ground return conductor, and
the ground return conductor is disposed between the at least one electrical component and the magnetic core.

23. The electrical assembly of claim 22, the bridge magnetic device further including N windings wound around at least a portion of the magnetic core, at least one of the N windings forming one or more stand-offs adapted to offset the magnetic core from the substrate, N being an integer greater than zero.

24. The electrical assembly of claim 23, the ground return conductor forming at least one additional stand-off adapted to offset the magnetic core from the outer surface of the substrate.

25. The electrical assembly of claim 24, N being an integer greater than one, the ground return connector comprising a plurality of solder tabs electrically coupled to conductors of the substrate, opposing ends of each of the N windings forming a respective solder tab electrically coupled to conductors of the substrate, the plurality of solder tabs of the ground return conductor being interleaved with the solder tabs of the N windings.

26. The electrical assembly of claim 23, further comprising:
N switching circuits, each of the N switching circuits adapted to repeatedly switch a first end of a respective one of the N windings between two different voltage levels;
wherein the bridge magnetic device and the N switching circuits form at least part of a switching power converter; and
wherein the ground return conductor is electrically coupled between the N switching circuits and a load powered by the switching power converter, to provide a path for current flowing from the load to the N switching circuits.

27. The electrical assembly of claim 23, opposing ends of at least one of the N windings forming solder tabs surface mount soldered to conductors of the substrate.

28. The electrical assembly of claim 22, the magnetic core not forming a magnetic path loop around the ground return conductor.

29. The electrical assembly of claim 22, the bridge magnetic device being selected from the group consisting of a bridge inductor and a bridge transformer.

30. The electrical assembly of claim 22, the magnetic core having opposing first and second sides, the ground return conductor extending from the first side to the second side of the magnetic core.

31. An electrical assembly comprising:
a substrate;
a bridge inductor disposed on an outer surface of the substrate, the bridge inductor including:
a magnetic core offset from and disposed over a first portion of the outer surface of the substrate in a first direction,
a winding wound around at least a portion of the magnetic core, the winding having opposing first and second ends electrically coupled to conductors of the substrate; and
a ground return conductor disposed on an outer surface of the magnetic core facing the first portion of the outer surface of the substrate in the first direction, the ground return conductor being electrically coupled to conductors of the substrate;

a switching circuit operable to repeatedly switch the first end of the winding between at least two different voltage levels;

a plurality of capacitors disposed on the first portion of the outer surface of the substrate such that the plurality of capacitors are disposed in the first direction between the outer surface of the substrate and the bridge inductor, the plurality of capacitors electrically coupled to the second end of the winding; and a load disposed on the substrate proximate to the second end of the winding, the load being electrically coupled to the second end of the winding, the bridge inductor, the switching circuit, and the plurality of capacitors collectively forming at least part of a switching power converter operable to at least partially power the load.

32. The electrical assembly of claim 31, the magnetic core having opposing first and second sides, the first end of the winding terminating at the first side of the magnetic core, the second end of the winding terminating at the second side of the magnetic core, and the load being disposed at the second side of the magnetic core.

33. The electrical assembly of claim 32, the load comprising a processor of an information technology device.

34. The electrical assembly of claim 32, the first and second ends of the winding forming respective first and second solder tabs surface mount soldered to conductors of the substrate.

35. The electrical assembly of claim 31, the switching circuit being disposed on the first portion of the outer surface of the substrate.

36. The electrical assembly of claim 31, the magnetic core not forming a magnetic path loop around the ground return conductor.

37. The electrical assembly of claim 31, the ground return conductor adapted to carry current flowing from the load to the switching circuit.

38. An electrical assembly, comprising:

a substrate;

a bridge magnetic device disposed on an outer surface of the substrate, the bridge magnetic device including:
- a magnetic core disposed over a first portion of the outer surface of the substrate in a first direction,
- N windings wound around at least a portion of the magnetic core, N being an integer greater than zero, and
- a ground return conductor disposed on an outer surface of the magnetic core facing the first portion of the outer surface of the substrate in the first direction, the ground return conductor being electrically coupled to conductors of the substrate, the N windings forming one or more flexible stand-offs offsetting the magnetic core from the first portion of the outer surface of the substrate in the first direction, the one or more flexible stand-offs allowing the magnetic core to move with respect to the substrate; and at least one electrical component disposed over the first portion of the outer surface of the substrate, such that the at least one electrical component is disposed in the first direction between the outer surface of the substrate and the bridge magnetic device.

39. The electrical assembly of claim 38, the ground return conductor forming one or more additional flexible stand-offs offsetting the magnetic core from the first portion of the outer surface of the substrate, the one or more additional flexible stand-offs allowing the magnetic core to move with respect to the substrate.

40. The electrical assembly of claim 39, the magnetic core not forming a magnetic path loop around the ground return conductor.

41. The electrical assembly of claim 38, the bridge magnetic device being selected from the group consisting of a bridge inductor and a bridge transformer.

* * * * *